United States Patent
Uchino et al.

(10) Patent No.: US 11,483,873 B2
(45) Date of Patent: *Oct. 25, 2022

(54) USER EQUIPMENT AND BASE STATION APPARATUS

(71) Applicant: NTT DOCOMO, INC., Tokyo (JP)

(72) Inventors: Tooru Uchino, Tokyo (JP); Hideaki Takahashi, Tokyo (JP); Hiroki Harada, Tokyo (JP); Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/971,537

(22) PCT Filed: Feb. 22, 2019

(86) PCT No.: PCT/JP2019/006853
§ 371 (c)(1),
(2) Date: Aug. 20, 2020

(87) PCT Pub. No.: WO2019/167842
PCT Pub. Date: Sep. 6, 2019

(65) Prior Publication Data
US 2021/0092775 A1    Mar. 25, 2021

(30) Foreign Application Priority Data
Mar. 2, 2018   (JP) .............................. JP2018-038095

(51) Int. Cl.
*H04W 74/02*    (2009.01)
*H04W 74/08*    (2009.01)
*H04W 56/00*    (2009.01)

(52) U.S. Cl.
CPC ..... *H04W 74/0833* (2013.01); *H04W 56/001* (2013.01); *H04W 74/02* (2013.01)

(58) Field of Classification Search
CPC ..... H04W 72/04; H04W 88/08; H04W 76/00; H04W 74/0833; H04W 56/001; H04W 74/02
See application file for complete search history.

(56) References Cited

U.S. PATENT DOCUMENTS 10,701,684 B2 *  6/2020  Yoo .......................... H04L 1/08
10,880,927 B2 * 12/2020  Islam ................ H04W 74/0833
(Continued)

FOREIGN PATENT DOCUMENTS

WO    2017169611  A1    10/2017

OTHER PUBLICATIONS

International Search Report issued in PCT/JP2019/006853 dated Apr. 9, 2019 (4 pages).

(Continued)

*Primary Examiner* — Robert C Scheibel
*Assistant Examiner* — Prenell P Jones
(74) *Attorney, Agent, or Firm* — Osha Bergman Watanabe & Burton LLP

(57) ABSTRACT

User equipment for receiving an instruction to perform a random access procedure from a base station apparatus is provided. The user equipment includes a receiver configured to receive, from the base station apparatus, information specifying available random access channel transmission occasions associated with a synchronization block, a controller configured to identify a random access channel transmission occasion based on the information, and a transmitter configured to transmit a random access preamble by using the identified random access channel transmission occasion.

4 Claims, 14 Drawing Sheets

(56) References Cited

U.S. PATENT DOCUMENTS

| | | | | |
|---|---|---|---|---|
| 2014/0314000 | A1* | 10/2014 | Liu | H04W 72/042 370/329 |
| 2019/0052329 | A1 | 2/2019 | Aiba et al. | |
| 2019/0053281 | A1* | 2/2019 | Strom | H04W 72/0413 |
| 2019/0159258 | A1* | 5/2019 | Islam | H04W 56/00 |
| 2019/0327764 | A1* | 10/2019 | Yoo | H04L 5/0048 |
| 2019/0364606 | A1* | 11/2019 | Strom | H04W 72/0413 |
| 2020/0404703 | A1* | 12/2020 | Uchino | H04L 5/0053 |
| 2021/0037487 | A1* | 2/2021 | Ohara | H04W 74/0833 |

OTHER PUBLICATIONS

Written Opinion of the International Searching Authority issued in PCT/JP2019/006853 dated Apr. 9, 2019 (4 pages).

NTT DOCOMO, Inc.; "Remaining issues on RACH procedure"; 3GPP TSG RAN WG1 Meeting #92, R1-1802465; Athens, Greece; Feb. 26-Mar. 2, 2018 (6 pages).

NTT DOCOMO, Inc.; "[D312/322] RACH resources for contention-free RA including BFR"; 3GPP TSG-RAN WG2 #101, R2-1803627; Athens, Greece; Feb. 26-Mar. 2, 2018 (5 pages).

LG Electronics Inc.; "E-mail discussion 101#69—PRACH Table"; 3GPP TSG-RAN WG2 #101 Bis, R2-1805948; Sanya, P.R. of China; Apr. 16-20, 2018 (23 pages).

Ericsson; "PRACH Mask design"; 3GPP TSG-RAN WG2 #101bis, Tdoc R2-1805420; Sanya, P.R. China; Apr. 16-20, 2018 (4 pages).

Ericsson; "Remaining details of RACH procedure"; 3GPP TSG RAN WG1 Meeting #92, R1-1802946; Athens, Greece; Feb. 26-Mar. 2, 2018 (5 pages).

3GPP TS 38.213 V15.0.0; "3rd Generation Partnership Project; Technical Specification Group Radio Access Network NR; Physical layer procedures for control (Release 15)" Dec. 2017 (56 pages).

3GPP TS 38.321 V15.0.0; "3rd Generation Partnership Project; Technical Specification Group Radio Access Network; NR; Medium Access Control (MAC) protocol specification (Release 15)" Dec. 2017 (55 pages).

Office Action issued in Indian Application No. 202037040461; dated Aug. 30, 2021 (7 pages).

3GPP TSG RAN WG1 Meeting #92; R1-1802387 "NR RACH procedures" Intel Corporation; Athens, Greece; Feb. 26-Mar. 2, 2018 (7 pages).

3GPP TSG RAN WG1 Meeting #92; R1-1801410 "Remaining details of RACH procedure" ZTE, Sanechips; Athens, Greece; Feb. 26-Mar. 2, 2018 (13 pages).

Office Action issued in Japanese Application No. 2020-503472; dated Oct. 19, 2021 (7 pages).

3GPP TSG-RAN WG1#NR1801; R1-1801274 "Summary of Remaining Details on RACH Procedure" Nokia, Nokia Shanghai Bell; Vancouver, BC, Canada; Jan. 22-26, 2018 (54 pages).

3GPP TSG RAN WG1 Meeting #91; R1-1719346 "Remaining details of RACH procedure" ZTE, Sanechips; Reno, USA; Nov. 27-Dec. 1, 2017 (30 pages).

Extended European Search Report issued in European Application No. 19760685.8, dated Nov. 9, 2021 (9 pages).

Office Action issued in Japanese Application No. 2020-503472; dated May 10, 2022 (5 pages).

* cited by examiner

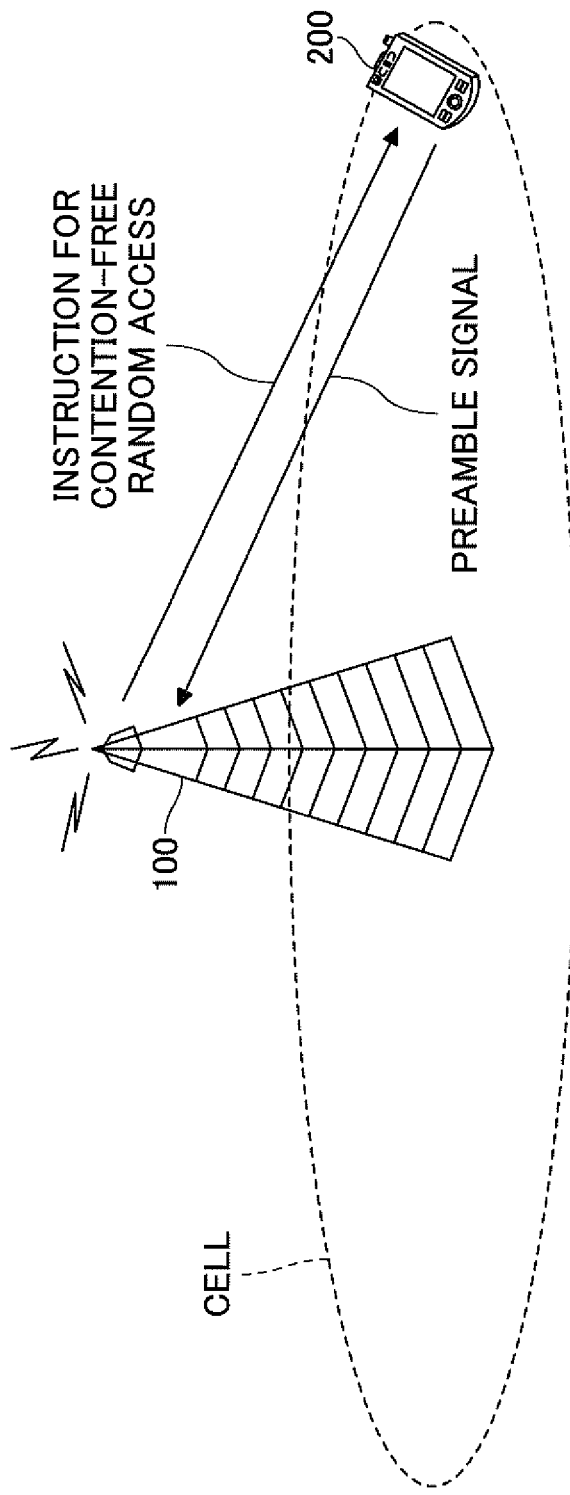

FIG.2

| PRACH MASK INDEX | ALLOWED PRACH (FDD) | ALLOWED PRACH (TDD) |
|---|---|---|
| 0 | ALL | ALL |
| 1 | PRACH RESOURCE INDEX 0 | PRACH RESOURCE INDEX 0 |
| 2 | PRACH RESOURCE INDEX 1 | PRACH RESOURCE INDEX 1 |
| 3 | PRACH RESOURCE INDEX 2 | PRACH RESOURCE INDEX 2 |
| 4 | PRACH RESOURCE INDEX 3 | PRACH RESOURCE INDEX 3 |
| 5 | PRACH RESOURCE INDEX 4 | PRACH RESOURCE INDEX 4 |
| 6 | PRACH RESOURCE INDEX 5 | PRACH RESOURCE INDEX 5 |
| 7 | PRACH RESOURCE INDEX 6 | RESERVED |
| 8 | PRACH RESOURCE INDEX 7 | RESERVED |
| 9 | PRACH RESOURCE INDEX 8 | RESERVED |
| 10 | PRACH RESOURCE INDEX 9 | RESERVED |
| 11 | EVERY, IN THE TIME DOMAIN, EVEN PRACH OPPORTUNITY FROM 1ST PRACH RESOURCE INDEX IN SUBFRAME | EVERY, IN THE TIME DOMAIN, EVEN PRACH OPPORTUNITY FROM 1ST PRACH RESOURCE INDEX IN SUBFRAME |
| 12 | EVERY, IN THE TIME DOMAIN, ODD PRACH OPPORTUNITY FROM 1ST PRACH RESOURCE INDEX IN SUBFRAME | EVERY, IN THE TIME DOMAIN, ODD PRACH OPPORTUNITY FROM 1ST PRACH RESOURCE INDEX IN SUBFRAME |
| 13 | RESERVED | 1ST PRACH RESOURCE INDEX IN SUBFRAME |
| 14 | RESERVED | 2ND PRACH RESOURCE INDEX IN SUBFRAME |
| 15 | RESERVED | 3RD PRACH RESOURCE INDEX IN SUBFRAME |

USER EQUIPMENT AND BASE STATION APPARATUS

BACKGROUND OF THE INVENTION

1. Field of the Invention

The present invention generally relates to user equipment and a base station apparatus in a radio communication system.

2. Description of the Related Art

In the 3GPP (3rd Generation Partnership Project), a radio communication scheme called 5G or New Radio (NR) (the radio communication scheme is hereinafter referred to as "5G" or "NR") has been discussed in order to further increase a system capacity and a data transmission rate, and further reduce latency in a radio section. In 5G, various radio technologies have been discussed in order to satisfy required conditions that makes latency in a radio section less than or equal to 1 ms while achieving throughput of 10 Gbps or more.

In NR, at initial access for establishing a connection between user equipment and a base station apparatus, the user equipment receives a synchronization signal from the base station apparatus in order to detect and identify a cell and to obtain part of system information necessary for the initial access (Non-Patent Document 1, for example).

Also, similarly to Long-Term Evolution (LTE), NR defines two types of random access-contention-based random access (CBRA) and contention-free random access (CFRA) (Patent Document 2, for example).

RELATED-ART DOCUMENTS

Non-Patent Documents

[NON-PATENT DOCUMENT 1] 3GPP TS 38.213 V15.0.0 (2017-12)
[NON-PATENT DOCUMENT 2] 3GPP TS 38.321 V15.0.0 (2017-12)

SUMMARY OF THE INVENTION

Problem to be Solved by the Invention

A synchronization signal and part of system information necessary for initial access in NR is a resource unit called a synchronization signal block (SSB) composed of consecutive orthogonal frequency-division multiplexing (OFDM) symbols and mapped to a radio frame. User equipment receives a SSB transmitted from a base station apparatus in order to obtain information necessary for initial access. The information necessary for initial access includes information identifying a physical random access channel (PRACH) resource and a preamble signal format.

In NR, a PRACH resource used for contention-free random access triggered by the base station apparatus can be secured individually for each user equipment device, thus avoiding a PRACH resource collision between the user equipment devices. Further, in NR, PRACH resources are associated with SSBs.

However, when PRACH resources are individually indicated to user equipment, associations between SSBs and PRACH resources in NR are not taken into account, often causing the user equipment to be unable to use a proper PRACH resource.

In view of the above, it is a general object of the present invention to allow user equipment to use a proper PRACH resource in a random access procedure in NR.

Means to Solve the Problem

According to the disclosed technology, user equipment for receiving an instruction to perform a random access procedure from a base station apparatus is provided. The user equipment includes a receiver configured to receive, from the base station apparatus, information specifying available random access channel transmission occasions associated with a synchronization block, a controller configured to identify a random access channel transmission occasion based on the information, and a transmitter configured to transmit a random access preamble by using the identified random access channel transmission occasion.

Effects of the Invention

According to the disclosed technology, it is possible to allow user equipment to use a proper PRACH resource in a random access procedure in NR.

BRIEF DESCRIPTION OF THE DRAWINGS

FIG. 1 is a drawing illustrating a configuration example of a radio communication system according to an embodiment of the present invention;

FIG. 2 is a drawing illustrating an example of specifying RACH resources in a time domain;

DESCRIPTION OF THE PREFERRED EMBODIMENTS

Figure 3:
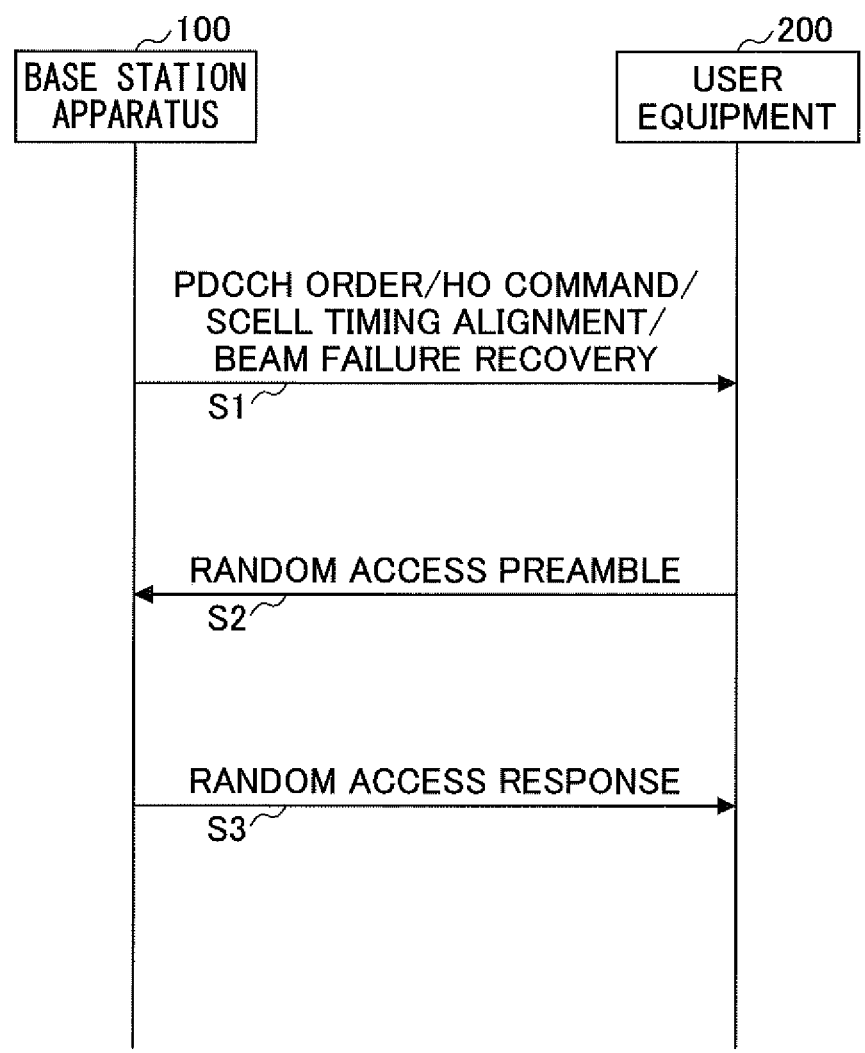
FIG. 3 is a sequence diagram illustrating an example of a random access procedure according to an embodiment of the present invention.

In the following, embodiments of the present invention will be described with reference to the accompanying drawings. The embodiments described below are merely examples, and embodiments to which the present invention is applied are not limited to the following embodiments.

An existing technology can be used as necessary when a radio communication system according to the embodiments of the present invention is operated. The existing technology is, for example, LTE, but is not limited thereto. Also, as used herein, the term "LTE" has a broader meaning including LTE-Advanced and schemes (such as NR) after LTE-Advanced, unless otherwise specified.

Also, in the embodiments of the present invention described below, terms such as "synchronization signal (SS)", "primary SS (PSS)", "secondary SS (SSS)", "physical broadcast channel (PBCH)", and "physical RACH (PRACH)" used in the existing LTE are used. However, these terms are used for convenience of description, and a signal, a function, and the like similar to these terms may be referred to by other names.

Also, in the embodiments of the present invention, a duplex mode may be a time division duplex (TDD) mode, may be a frequency division duplex (FDD) mode, or may be other modes (such as flexible duplex). Also, in the following description, transmitting a signal by using a transmission beam may include transmitting a signal multiplied by a precoding vector (a signal pre-coded by a precoding vector). Similarly, receiving a signal by using a reception beam may include multiplying a received single by a predetermined weight vector. Also, transmitting a signal by using a transmission beam may include transmitting a signal through a specific antenna port. Similarly, receiving a signal by using a reception beam may include receiving a signal through a specific antenna port. An antenna port refers to a logical antenna port or a physical antenna port defined in the 3GPP specifications. A method of forming a transmission beam and a reception beam is not specifically limited. For example, in a base station apparatus 100 including a plurality of antennas or in user equipment 200, a method for changing each antenna angle may be used, a method for using a precoding vector may be used in combination with the method for changing each antenna angle, a method for switching between different antenna panels may be used, a method for using a plurality of antenna panels may be used, or other methods may be used. Further, for example, in a high-frequency band, a plurality of different transmission beams may be used. An operation that uses a plurality of transmission beams is referred to as a multi-beam operation. An operation that uses a single transmission beam is referred to as a multi-beam operation.

FIG. 1 is a drawing illustrating a radio communication system according to an embodiment of the present invention. The radio communication system according to the embodiment of the present invention includes a base station apparatus 100 and user equipment 200, as illustrated in FIG. 1. FIG. 1 illustrates the single base station apparatus 100 and the single user equipment 200; however, this is merely an example. The radio communication system may include a plurality of user equipment devices and base station apparatuses.

The base station apparatus 100 is a communication apparatus that provides one or more cells and wirelessly communicates with the user equipment 200. As illustrated in FIG. 1, the base station apparatus 100 transmits an instruction for contention-free random access to the user equipment 200. Also, the base station apparatus 100 transmits synchronization signals and system information to the user equipment 200. The synchronization signals are, for example, a NR-PSS and a NR-SSS. The system information is transmitted via, for example, a NR-PBCH. The system information may be referred to as broadcast information. The base station apparatus 100 and the user equipment 200 can each transmit/receive a signal by performing beamforming. The user equipment 200 is a communication apparatus equipped with a wireless communication function such as a smartphone, a tablet, a wearable device, and a communication module for M2M (Machine-to-Machine). The user equipment 200 wirelessly connects to the base station apparatus 100 and utilizes various communication services provided by the radio communication system. At an initial access stage, as illustrated in FIG. 1, the user equipment 200 transmits a random access preamble signal to the base station apparatus 100. The random access is performed based on the system information carried on the NR-PBCH transmitted from the base station apparatus 100 and also based on remaining minimum system information (RMSI) that is system information carried on a physical downlink shared channel (NR-PDSCH) scheduled by a physical downlink control channel (NR-PDCCH). The RMSI includes, for example, information necessary for the initial access such as RACH settings.

FIG. 2 is a drawing illustrating an example of specifying RACH resources in a time domain or a frequency domain. Examples of PRACH mask indexes specifying RACH resources in the time domain and/or the frequency domain are illustrated in FIG. 2. A PRACH mask index is information for indicating, to the user equipment 200, of RACH resources specified by PRACH configuration indexes, which RACH resources in the time domain and/or in the frequency domain are available.

In FDD PRACH of the illustrated example of FIG. 2, 10 PRACH resource indexes from PRACH resource index 0 to PRACH resource index 9, every even-numbered PRACH transmission occasion starting from the first PRACH resource index in a subframe, and every odd-numbered PRACH transmission occasion starting from the first PRACH resource index in a subframe can be configured.

In TDD PRACH of the illustrated example of FIG. 2, 6 PRACH resource indexes from PRACH resource index 0 to PRACH resource index 5, every even-numbered PRACH transmission occasion starting from the first PRACH resource index in a subframe, every odd-numbered PRACH transmission occasion starting from the first PRACH resource index in a subframe, the first PRACH resource index in a subframe, the second PRACH resource index in a subframe, and the third PRACH resource index in a subframe can be configured.

When PRACH resources are individually secured for each of multiple user equipment devices 200, the use of the PRACH mask indexes can avoid a lack of PRACH resources by limiting PRACH resources to be used by the user equipment devices 200 in the time domain or in the frequency domain. For example, a mapping table for the PRACH mask indexes illustrated in FIG. 2 may define which time-domain resources and/or frequency-domain resources are available to the user equipment 200. In NR, as compared to LTE, use cases where random access procedures are performed have been increasing. Thus, there may be a possibility that the risk of lacking PRACH resources may increase. For example, a random access procedure is triggered by beam failure recovery or by an on-demand system information operation where system information is transmitted in response to a request from the user equipment 200.

FIG. 3 is a sequence diagram illustrating an example of a random access procedure according to an embodiment of the present invention. In step S1, an instruction to perform contention-free random access, triggered by a PDCCH order, a handover (HO) command, secondary cell (SCell) timing alignment, or beam failure recovery (recovery from beam failure), is transmitted from the base station apparatus 100 to the user equipment 200. The PDCCH order triggers, if the user equipment 200 is in connected mode and uplink (UL) may be out of synchronization, the user equipment 200 to perform a random access procedure on a network so as to bring the UL back to an in-synchronization state. The handover command triggers the user equipment 200 to perform a random access procedure on a target cell during handover. The secondary cell timing alignment triggers the user equipment 200 to perform a random access procedure on a secondary cell for timing alignment on the secondary cell. The beam failure recovery triggers the user equipment 200 to perform a random access procedure for recovery from beam failure.

For example, in LTE, via the instruction to perform contention-free random access, information specifying RACH resources and preamble indexes, such as random access preamble indexes (6 bits) and PRACH mask indexes (4 bits) described in FIG. 2, is indicated to the user equipment 200 by using a downlink control information (DCI) format 1A. The above-described information specifying RACH resources and preamble indexes may be indicated by radio resource control (RRC) signaling.

Based on the preamble indexes and PRACH resources specified in the above manner, the user equipment 200 performs a random access procedure. Accordingly, contention-free random access can be performed. It is noted that when contention-based random access is performed, a preamble to be used is randomly selected from preamble indexes within a predetermined range.

In step S2, based on the information specifying RACH resources and preamble indexes obtained in step S1, the user equipment 200 transmits a random access preamble to the base station apparatus 100.

In step S3, the base station apparatus 100 transmits a random access response to the user equipment 200. The random access response is a response to the random access preamble. The random access response is transmitted on the PDCCH by using a random access radio network temporary identifier (RA-RNTI), and includes an identifier of the random access preamble, timing alignment, and an initial uplink grant. In the case of the contention-free random access, the random access procedure is completed in step S3.

Figure 4:
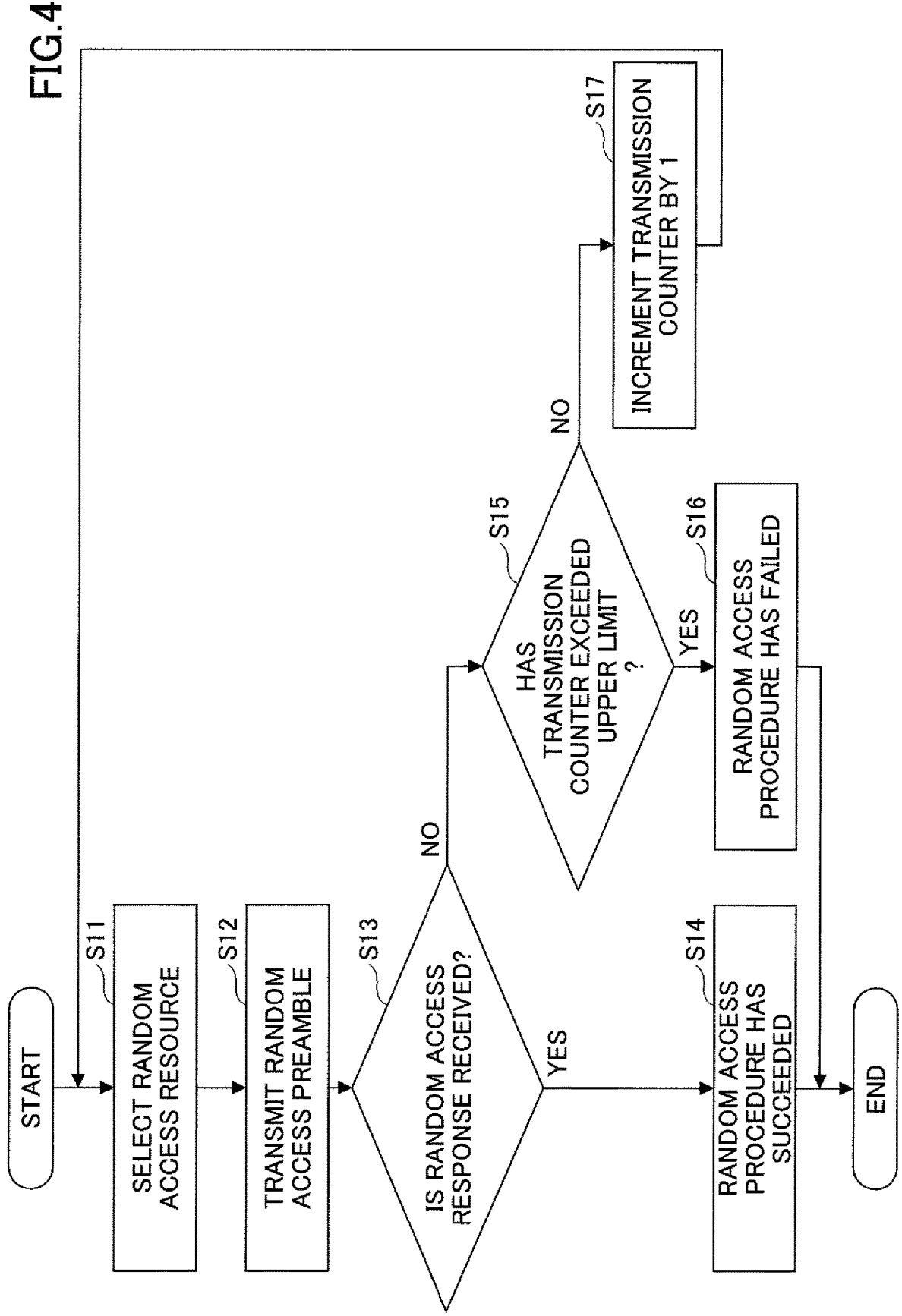
FIG. 4 is a flowchart illustrating an example of a random access procedure according to an embodiment of the present invention.

FIG. 4 is a flowchart illustrating an example of a random access procedure according to an embodiment of the present invention. The example of FIG. 4 illustrates a contention-free random access procedure performed in the user equipment 200. The base station apparatus 100 transmits a PSS, a SSS, and a PBCH. The PBCH includes part of system information. It is noted that a transmission counter of "1" is set when a random access procedure is started.

In step S11, based on resources for performing a random access procedure, which has been received from the base station apparatus 100, namely based on information specifying, for example, RACH resources in the frequency domain and the time domain and preamble formats, the user equipment 200 selects a resource used for random access. Next, the user equipment 200 uses the selected resource to transmit a random access preamble (S12). Settings for transmission power of a random access preamble will be described later.

In step S13, the user equipment 200 receives a random access response from the base station apparatus 100. The random access response is a response to the random access preamble. When the random access response is received by the user equipment 200 (yes in S13), the procedure proceeds to step S14. When the random access response is not received by the user equipment 200 (no in S13), the procedure proceeds to step S15.

In step S14, the user equipment 200 determines that the random access procedure has succeeded, and ends the random access procedure.

In step S15, the user equipment 200 determines whether the transmission counter has exceeded an indicated or a predefined upper limit. When the upper limit is exceeded (yes in S15), the procedure proceeds to step S16. When the upper limit is not exceeded (no in S15), the procedure proceeds to step S17.

In step S16, the user equipment 200 determines the random access procedure has failed, and ends the random access procedure. Conversely, in step S17, the user equipment 200 causes the transmission counter to be incremented by 1, and causes the procedure to return to step S11 in order to transmit a random access preamble again. In step S11, the user equipment 200 selects a random access resource again.

With the PRACH mask indexes based on the LTE MAC (Medium Access Control) specification, positions of resources in the time domain of the PRACH available to the user equipment 200 can be specified on a per-subframe basis within a radio frame, and for TDD, positions of resources in the frequency domain can be specified on a per-PRACH basis. Conversely, in NR, PRACH resources are flexibly allocated and specified. Thus, the PRACH mask indexes need to be designed to accommodate flexible allocation and specification of PRACH resources in NR.

In the time domain of the NR PRACH, PRACH resources can be set on a per-OFDM-symbol basis. In the frequency domain of the NR PRACH, a common PRACH that can be shared by user equipment devices 200 and a dedicated PRACH assigned to each user equipment device can be specified. In LTE CFRA, resources to be used are specified on a PRACH shared by user equipment devices 200. Conversely, in NR CFRA, resources to be used can be individually specified to each user equipment device 200. Also in NR, a bandwidth part (BWP) and supplemental UL (SUL) are employed, thus allowing resources in the frequency domain to be flexibly used.

Figure 5:
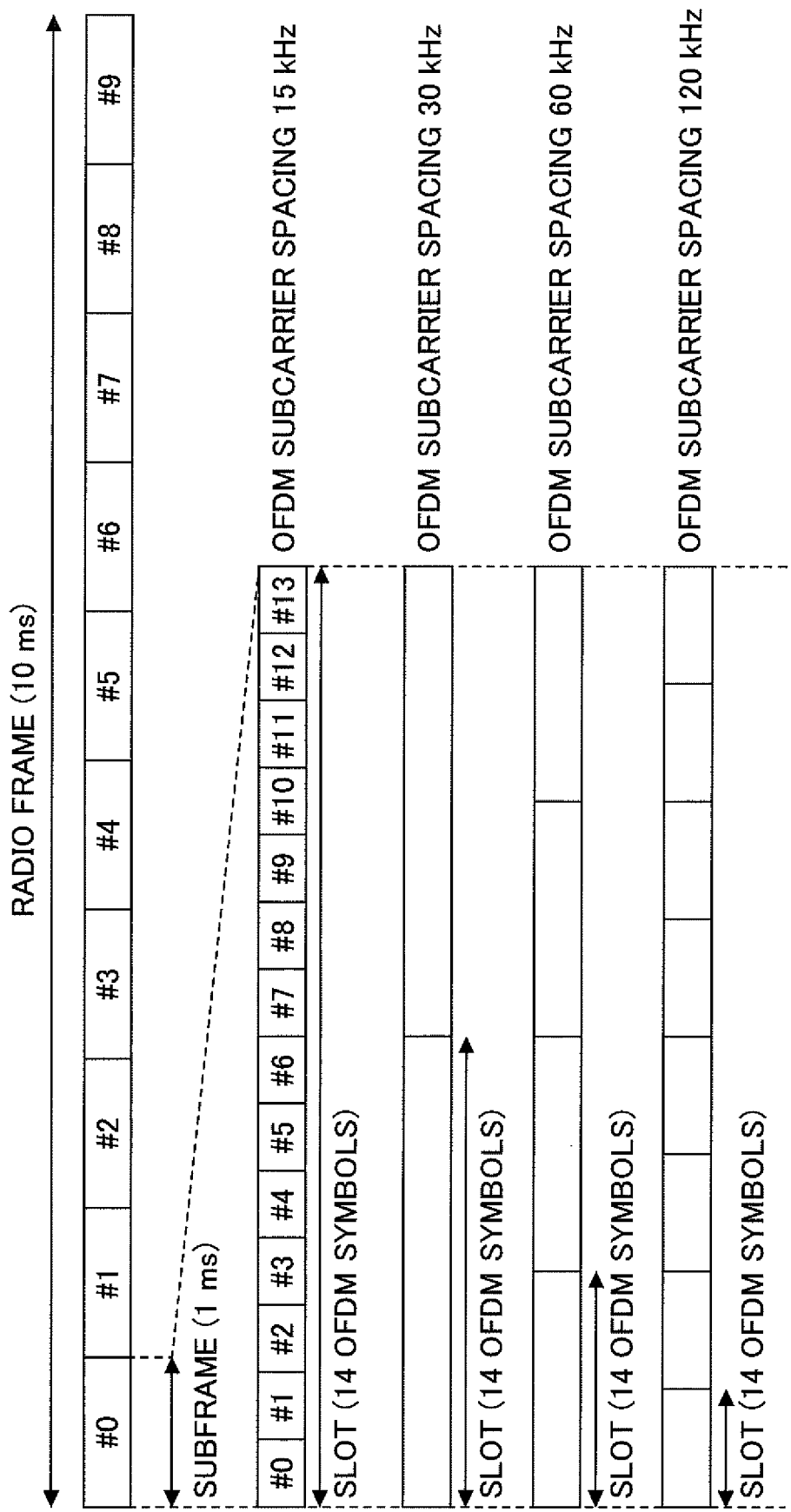
FIG. 5 is a drawing illustrating an example of a radio frame in a time domain according to an embodiment of the present invention.

FIG. 5 is a drawing illustrating an example of a radio frame in a time domain according to an embodiment of the present invention. As illustrated in FIG. 5, in NR, a radio frame of 10 ms is composed of 10 subframes each having a time duration of 1 ms. A slot is composed of 14 OFDM symbols. When OFDM subcarrier spacing is 15 kHz, one subframe is composed of one slot. When OFDM subcarrier spacing is 30 kHz, one subframe is composed of two slots. When OFDM subcarrier spacing is 60 kHz, one subframe is composed of four slots. When OFDM subcarrier spacing is 120 kHz, one subframe is composed of eight slots.

As PRACH resources available to the user equipment 200, subframe numbers, slot numbers, or OFDM symbol numbers may be explicitly specified by a PRACH mask index. When the OFDM subcarrier spacing is 120 kHz, the radio frame of 10 ms is composed of 80 slots, namely is composed of 1,120 OFDM symbols. Thus, 11-bit signaling may be used to explicitly indicate OFDM symbol numbers. Instead of the OFDM symbol numbers, subframe numbers or slot numbers may be used to specify available PRACH resources.

Also, as PRACH resources available to the user equipment 200, instead of the subframe numbers, the slot numbers, or the OFDM symbol numbers, predetermined numbers indicating PRACH transmission occasions (PRACH occasions) may be specified by a PRACH mask index. PRACH transmission occasions are specified in accordance with a predetermined pattern. Thus, signaling information can be reduced, as compared to when the OFDM symbol numbers are explicitly indicated.

Also, the level of granularity in specifying PRACH resources available to the user equipment 200 by using a PRACH mask index may be different in accordance with a UE capability, a frequency at which to perform communication, or subcarrier spacing. The frequency at which to perform communication may include a band and a band combination. For example, the user equipment 200 indicates a UE capability to a network, and based on the UE capability, the network may determine the level of granularity in specifying PRACH resources by using a PRACH mask index. Further, based on both a network capability and a UE capability, the network may determine the level of granularity in specifying PRACH resources by using a PRACH mask index. For example, in a case where, even if the user equipment 200 supports specification of PRACH resources by using OFDM symbol numbers, the network supports up to specification of PRACH resources by using slot numbers, the network sets/indicates, for/to the user equipment 200, information indicating that specification of PRACH resources is performed by using slot numbers. It is noted that when such information indicating that specification of PRACH resources is performed by using slot numbers has been set/indicated for/to the user equipment 200, the user equipment 200 may ignore specification of PRACH resources by using OFDM symbol numbers, if indicated.

Further, a plurality of subframes, slots, or OFDM symbols may be subjected to specification of PRACH resources available to the user equipment 200 in the time domain by using a PRACH mask index. For example, subframe numbers "0, 2, 4, 6, and 8" may be indicated. Namely, PRACH resources are specified in a cycle of 2 ms. For example, a subframe, a slot, or an OFDM symbol serving as a starting point may be explicitly indicated together with a cycle of PRACH resource allocation. For example, a subframe number of "3" and a cycle of "3 ms" may be indicated. In this case, the starting point is the subframe number of "3", and PRACH resources are allocated in a cycle of 3 ms. Accordingly, PRACH resources are allocated in subframes with the subframe numbers of 3, 6, and 9.

Further, PRACH resources available to the user equipment 200 in the time domain may be partially implicitly specified by a PRACH mask index. For example, any of subframe numbers, slot numbers, or OFDM symbol numbers may be implicitly determined. When PRACH resources are partially implicitly specified, the user equipment 200 assumes that specific subframe numbers, slot numbers, or OFDM symbol numbers are used.

For example, the first subframe, the first slot, or the first OFDM symbol in the time domain may be implicitly specified. Alternatively, subframes, slots, or OFDM symbols having specific numbers or identifiers may be implicitly specified. Further, for example, when a specific cycle X is assumed, the Y-th subframe, the Y-th slot, or the Y-th OFDM symbol may be implicitly specified. The cycle X may be specified for any of a radio frame, a subframe, a slot, or an OFDM symbol. The Y-th number may be an odd number or an even number. A subframe, a slot, or an OFDM symbol serving as a starting point of the cycle X may be explicitly specified, or may be implicitly determined by the user equipment 200. Examples of implicitly determining a starting point of the cycle X include a timing at which a random access procedure is triggered, namely a timing at which a PDCCH order is received, a timing at which PRACH resources are allocated immediately after a random access procedure is triggered, a timing when a predetermined period of time elapses after a random access procedure is triggered, or a timing at which PRACH resources are allocated immediately after a predetermined period of time elapses after a random access procedure is triggered.

Further, in a case where analog beamforming is used by the user equipment 200 for transmission and reception, PRACH resources in the time domain specified by a PRACH mask index may be limited to PRACH resources allocated to slots or OFDM symbols, which correspond to a SSB used by the user equipment 200. The SSB used by the user equipment 200 may be a currently used SSB or may be a cell-defining SSB. Alternatively, the SSB used by the user equipment 200 may be a specified SSB, if the SSB is specified with a PRACH resource.

When a PRACH resource other than the PRACH resources corresponding to the SSB used by the user equipment 200 is to be specified, a notification may be indicated from any of the RRC layer, the MAC layer, or the layer 1 to the network. Further, in the notification, a dedicated "cause" value may be set.

When PRACH resources in the time domain are implicitly specified by a PRACH mask index, assumed subframe numbers, slot numbers, or OFDM symbol numbers may be different for each user equipment device 200 or may be different for each group of user equipment devices 200. Further, when PRACH resources in the time domain are implicitly specified by a PRACH mask index, assumed subframe numbers, slot numbers, or OFDM symbol numbers may be indicated from the network to the user equipment 200 via any of the RRC layer, the MAC layer, or the layer 1, or may be preliminarily defined.

A method for specifying PRACH resources available to the equipment device 200 in the time domain by using a PRACH mask index may be different in accordance with the trigger for contention-free random access, such as a PDCCH order, a handover command, secondary timing alignment, or beam failure recovery. For example, when a certain number of bits can be sent in RRC signaling in the case of, for example, a handover command or beam failure recovery, PRACH resources available to the user equipment device 200 in the time domain may be explicitly specified by a PRACH mask index. For example, when the number of bits is relatively small in the case of, for example, a PDCCH order, PRACH resources available to the user equipment device 200 in the time domain may be implicitly specified by a PRACH mask index.

Further, the method for specifying PRACH resources available to the equipment device 200 in the time domain by using a PRACH mask index may be ignored in a specific case. For example, in order to specify PRACH resources in a specific frequency band, the above-described method is not required to be used.

Figure 6:
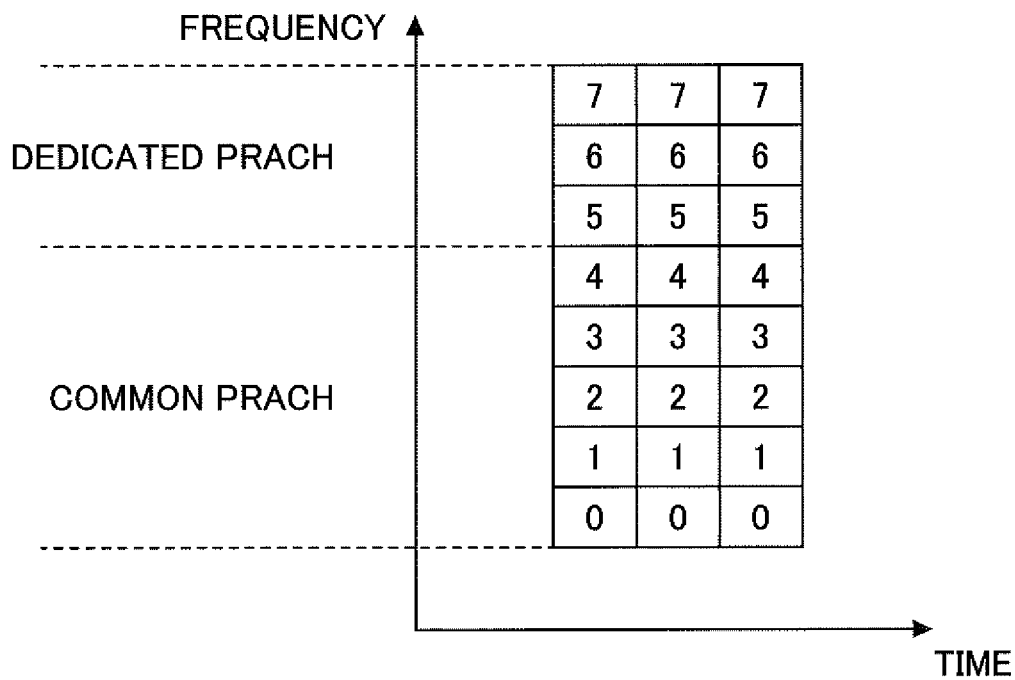
FIG. 6 is a drawing illustrating an example (1) of indexes in a frequency domain according to an embodiment of the present invention.

FIG. 6 is a drawing illustrating an example (1) of indexes in a frequency domain according to an embodiment of the present invention. As illustrated in FIG. 6, based on indexes assigned to a common PRACH or a dedicated PRACH, PRACH resource available to the user equipment device 200 in the frequency domain may be specified by a PRACH mask index. The common PRACH indicates a frequency domain to which PRACH resources shared by user equipment devices 200 are allocated. The dedicated PRACH indicates a frequency domain to which PRACH resources individually used by a user equipment device 200 are allocated. However, the dedicated PRACH may be shared by a plurality of user equipment devices 200.

In FIG. 6, sequential row indexes 0 to 7 are assigned. Specifically, the indexes 0 to 4 are assigned to the common PRACH and the indexes 5 to 7 are assigned to the dedicated PRACH. Based on these indexes, PRACH resources available to the user equipment device 200 in the frequency domain may be specified by a PRACH mask index.

Figure 7:
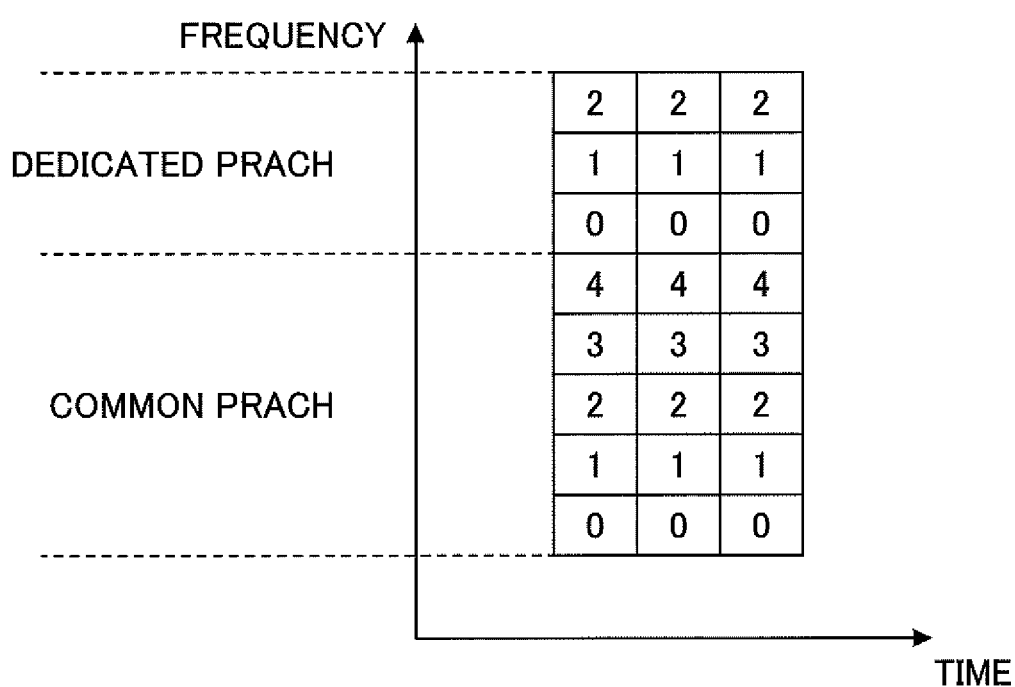
FIG. 7 is a drawing illustrating an example (2) of indexes in a frequency domain according to an embodiment of the present invention.

FIG. 7 is a drawing illustrating an example (2) of indexes in a frequency domain according to an embodiment of the present invention. In the example illustrated in FIG. 7, indexes 0 to 4 are assigned to the common PRACH, and indexes 0 to 2 are assigned to the dedicated PRACH. Namely, different row indexes are assigned to the common PRACH and the dedicated PRACH. Based on these indexes, PRACH resources available to the user equipment device 200 in the frequency domain may be specified by a PRACH mask index.

When indexes illustrated in FIG. 7 are specified, the indexes are indicated together with information indicating that either the common PRACH or the dedicated PRACH is specified. Alternatively, when the dedicated PRACH is specified, it may be assumed that the common PRACH will not be specified. In this case, even if information specifying the frequency domain with respect to a PRACH mask index is indicated, the user equipment 200 may partially or entirely ignore the information.

Figure 8:
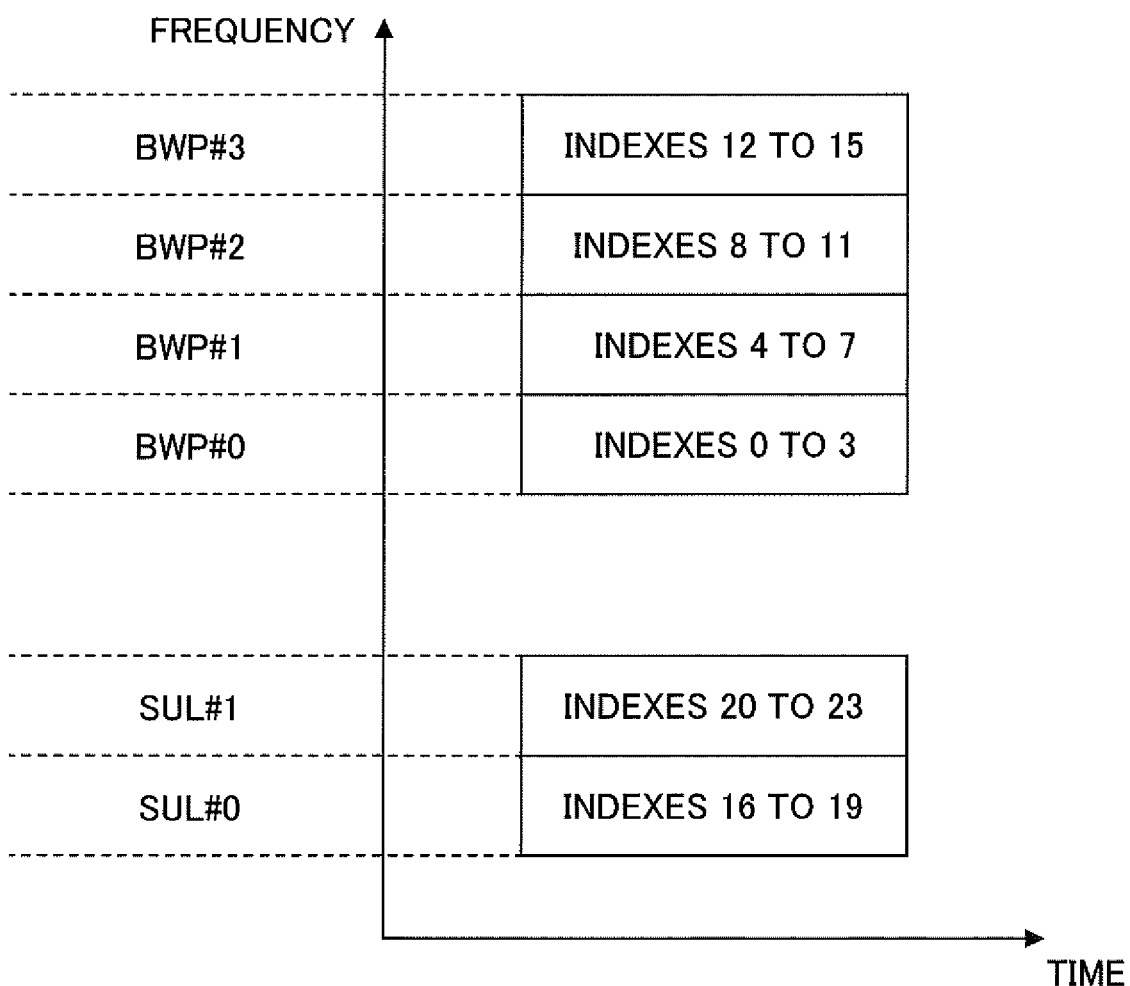
FIG. 8 is a drawing illustrating an example (3) of indexes in a frequency domain according to an embodiment of the present invention.

FIG. 8 is a drawing illustrating an example (3) of indexes in a frequency domain according to an embodiment of the present invention. As illustrated in FIG. 8, based on indexes assigned to BWP numbers and SUL numbers, PRACH resources available to the user equipment device 200 in the frequency domain may be specified by a PRACH mask index.

As illustrated in FIG. 8, sequential indexes 0 to 23 are assigned to the BWPs and the SUL. The indexes 0 to 3 are assigned to BWP #0, the indexes 4 to 7 are assigned to BWP #1, the indexes 8 to 11 are assigned to BWP #2, the indexes 12 to 15 are assigned to BWP #3, the indexes 16 to 19 are assigned to SUL #0, and the indexes 20 to 23 are assigned to SUL #1. Based on these indexes, PRACH resources available to the user equipment device 200 in the frequency domain are specified by a PRACH mask index within a corresponding BWP or SUL. In other words, the user equipment 200 can identify a BWP or SUL to which PRACH resources are allocated. It is noted that the indexes assigned to the BWPs and the SUL illustrated in FIG. 8 are merely examples. For example, indexes may be assigned to the SUL first. Further, the number of indexes assigned to a single BWP or single SUL is not limited to 4. Further, sequential row indexes may be assigned, regardless of BWPs, non-SUL, or SUL.

Figure 9:
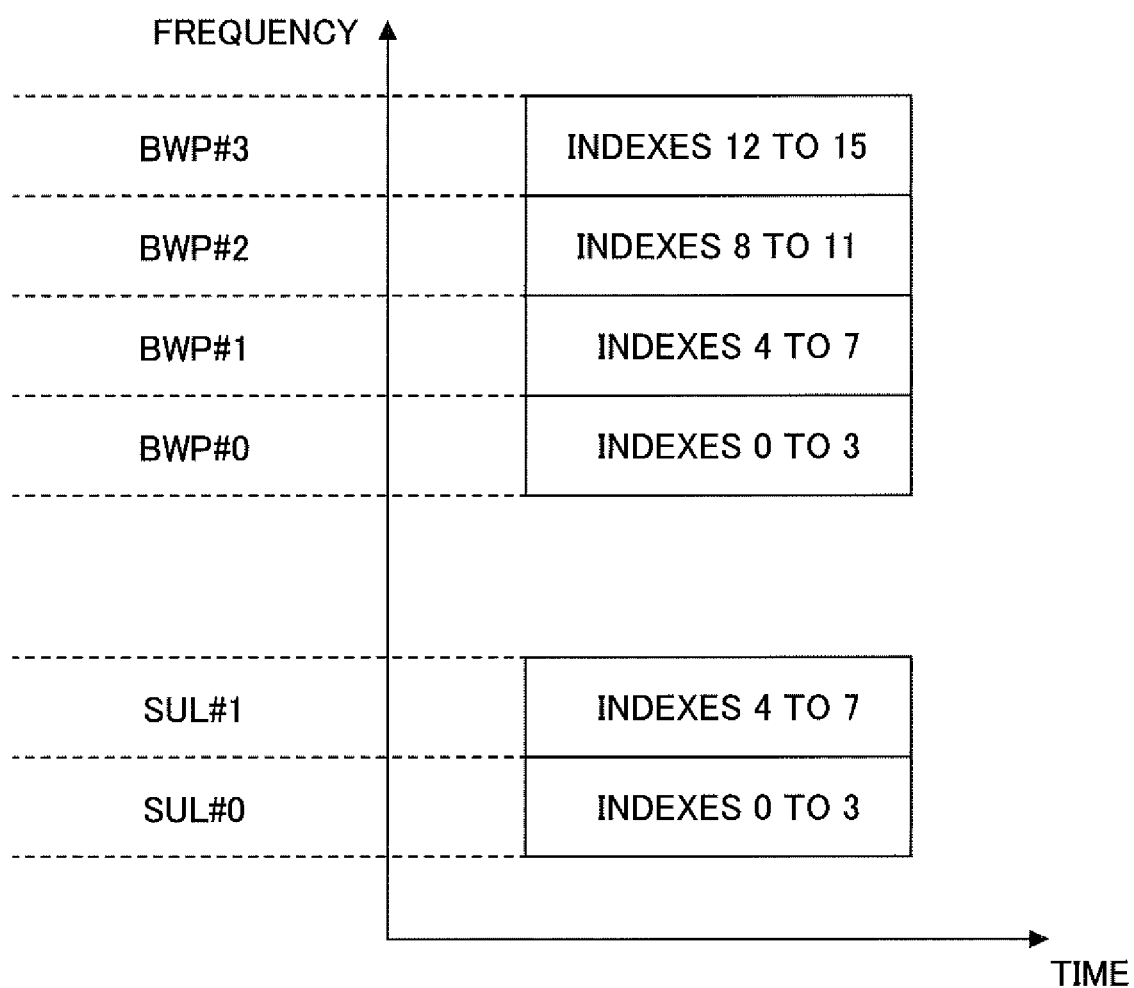
FIG. 9 is a drawing illustrating an example (4) of indexes in a frequency domain according to an embodiment of the present invention.

FIG. 9 is a drawing illustrating an example (4) of indexes in a frequency domain according to an embodiment of the present invention. As illustrated in FIG. 9, row indexes 0 to 15 are assigned to BWPs, and row indexes 0 to 7 are assigned to SUL. The indexes 0 to 3 are assigned to BWP #0, the indexes 4 to 7 are assigned to BWP #1, the indexes 8 to 11 are assigned to BWP #2, the indexes 12 to 15 are assigned to BWP #3, the indexes 0 to 3 are assigned to SUL #0, and the indexes 4 to 7 are assigned to SUL #1. Based on these indexes, PRACH resources available to the user equipment device 200 in the frequency domain are specified by a PRACH mask index within corresponding BWP(s) or SUL. Further, information indicating that either a BWP or SUL is specified may be indicated together with the specified PRACH resources indexes. Further, it is noted that the indexes assigned to the BWPs and the SUL illustrated in FIG. 9 are merely examples. For example, the length of an index sequence may be different for each BWP and for each SUL. Also, a different row index may be assigned on a per-BWP basis, on a per-non-SUL basis, and on a per-SUL basis.

Figure 10:
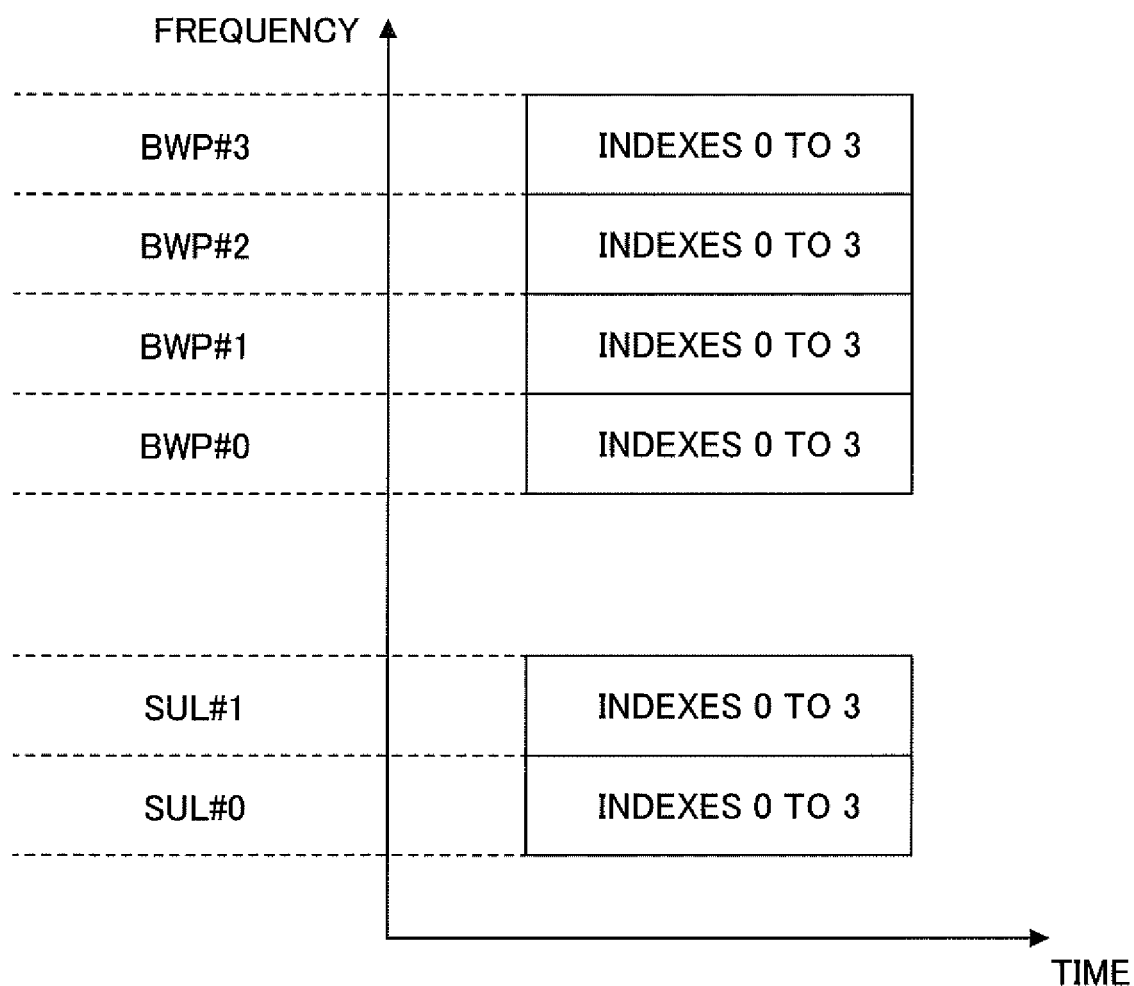
FIG. 10 is a drawing illustrating an example (5) of indexes in a frequency domain according to an embodiment of the present invention.

FIG. 10 is a drawing illustrating an example (5) of indexes in a frequency domain according to an embodiment of the present invention. As illustrated in FIG. 10, row indexes 0 to 3 are assigned to each BWP, and also to each SUL. The row indexes 0 to 3 are assigned to BWP #0, BWP #1, BWP #2, BWP #3, SUL #0, and SUL #1 in common. Based on these indexes, PRACH resources available to the user equipment device 200 in the frequency domain are specified by a PRACH mask index within corresponding BWP(s) or SUL. Further, it is noted that the example of index assignment to the BWPs and the SULs illustrated in FIG. 10 is merely an example. For example, the length of an index sequence may differ for each BWP and each SUL. Also, a different row index may be assigned on a per-BWP basis, on a per-non-SUL basis, and on a per-SUL basis.

The above-described methods for specifying PRACH resources available to the user equipment 200 in the time domain and the frequency domain by using a PRACH mask index may be different in accordance with the trigger for contention-free random access, such as a PDCCH order, a handover command, secondary timing alignment, or beam failure recovery.

The above-described methods for specifying PRACH resources available to the user equipment 200 in the time domain and the frequency domain by using a PRACH mask index may be applied to a case where PRACH resource(s) can be individually allocated to a user equipment device 200 or a group of user equipment devices 200, regardless of the state of the user equipment device 200 or the group of user equipment devices 200, namely regardless of an RRC idle state, an RRC connected state, or an RRC suspended state. For example, when a user equipment device 200 is in an idle state, based on an identifier (an IMEI number or a telephone number) of the user equipment device 200, a PRACH resource may be individually allocated via broadcast information.

In a case where only one PRACH resource can be specified by the base station apparatus 100 to the user equipment 200 based on the above-described PRACH resource specification using the PRACH mask indexes, an information element that specifies the PRACH resource and that is included in a notification may be omitted, may be ignored by the user equipment 200, or may be interpreted in a specific manner. For example, examples of the case where only one PRACH resource can be specified include a case where a dedicated PRACH resource is allocated to the user equipment 200 and the dedicated PRACH resource is uniquely specified. Interpretation in a specific manner means that the information element is interpreted as "Any", "All", "Out-of-Range", or "Invalid", for example.

Figure 11:
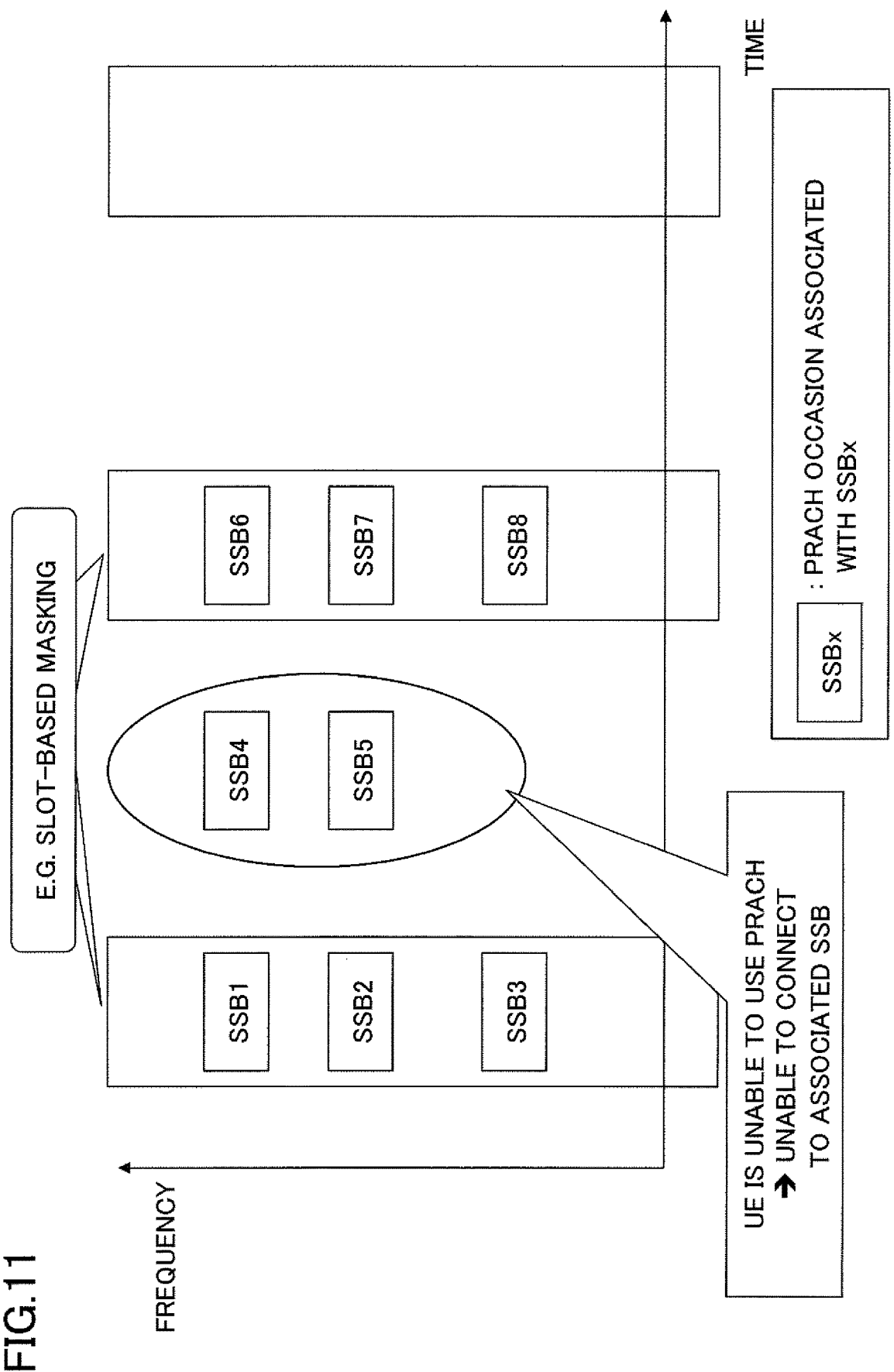
FIG. 11 is a drawing illustrating an example (1) of PRACH masking according to an embodiment of the present invention.

FIG. 11 is a drawing illustrating an example (1) of PRACH masking according to an embodiment of the present invention. Since SSBs are associated with PRACH resources, available SSBs may be limited depending on settings of the PRACH masks that specify PRACH resources available to the user equipment 200, as illustrated in FIG. 11. The performance of a SSB associated with an available PRACH resource is not necessarily higher. Thus, when contention-free random access is triggered, there may be cases where a SSB with lower performance would be used.

In FIG. 11, there are eight SSBs from SSB1 to SSB 8, and the SSBs are associated with PRACH resources. In slot-based PRACH masking (PRACH masking per slot) as illustrated in FIG. 11, when PRACH resources associated with the SSB1, the SSB2, and the SSB3 are available, and also PRACH resources associated with the SSB6, the SSB7, and the SSB8 are available, PRACH resources associated with the SSB4 and the SSB5 are not available to the user equipment 200. Namely, the SSB4 and the SSB5 are unable to be used. Thus, if the performance of the SSB4 and the SSB5 were to be higher than that of the other SSBs, the user equipment 200 would need to use the lower performance SSBs.

In view of the above, methods for performing PRACH masking without limiting SSBs available to the user equipment 200 for as long as possible are conceived as follows.
1) Method for adjusting a PRACH masking cycle
2) Method for masking each PRACH resource associated with a SSB
Both methods 1) and 2) may be performed. PRACH transmission occasion candidates subjected to PRACH masking may be preliminarily defined or indicated. It is noted that a PRACH resource corresponds to a resource identified in the PRACH time domain and frequency domain, and a PRACH transmission occasion corresponds to a resource identified in the PRACH time domain and frequency domain and also identified with a preamble index. In the following description, a "PRACH resource" may be replaced with a "PRACH transmission occasion".

Figure 12:
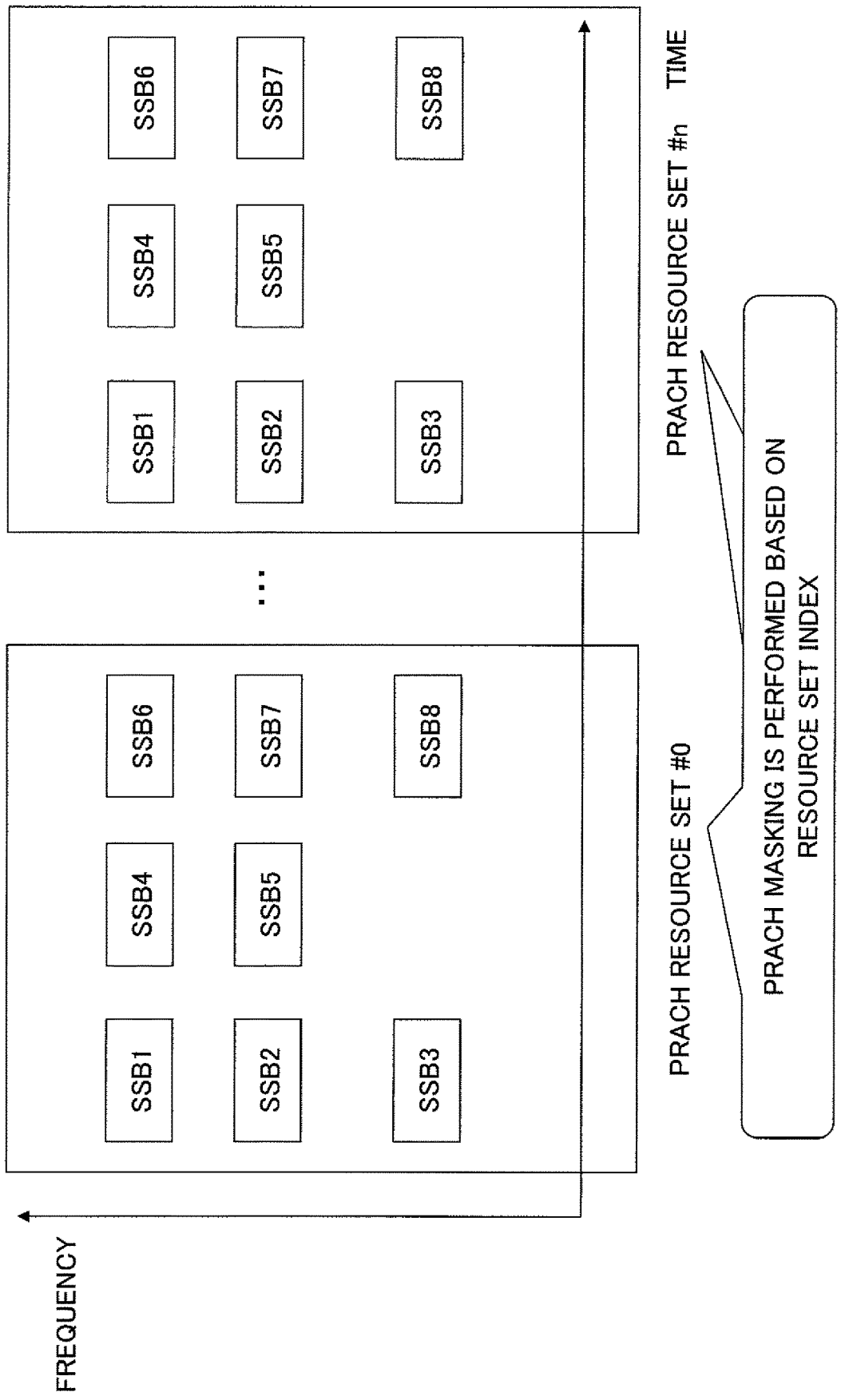
FIG. 12 is a drawing illustrating an example (2) of PRACH masking according to an embodiment of the present invention.

FIG. 12 is a drawing illustrating an example (2) of PRACH masking according to an embodiment of the present invention. A cycle of associating PRACH resources with SSBs in the time domain does not necessarily correspond to a slot cycle. Thus, a PRACH masking cycle is defined by a cycle of associating PRACH resources with SSBs in the time domain.

First, a cycle of associating PRACH resources with SSBs in the time domain is calculated. The user equipment 200 calculates a cycle of associating PRACH resources with SSBs in the time domain, based on association information between PRACH transmission occasions and SSBs determined by PRACH-ConfigIndex. Further, a cycle of associating PRACH resources with SSBs in the time domain may be determined such that the user equipment 200 can select all SSBs, or such that the user equipment 200 can select specific SSBs or specific PRACH resources. For example, by limiting the number of SSBs that can be used, it becomes possible to shorten the cycle so as to reduce a delay due to a wait for a PRACH resource.

Herein, the user equipment 200 manages, as a set of PRACH resources, PRACH resources within a section of the cycle of associating PRACH resources with SSBs in the time domain.

The user equipment 200 calculates the number of sets of PRACH resources included in a predetermined period of time, by dividing the predetermined period of time by the cycle of associating PRACH resources with SSBs. Then, the user equipment 200 sequentially assigns PRACH mask indexes to the sets of PRACH resources in the time domain. The predetermined period of time may be a period of time corresponding to one radio frame or corresponding to a plurality of time frames. Further, the network may specify a cycle of associating PRACH resources with SSBs in the time domain, and the cycle may be changed in accordance with the UE capability or the network capability.

The user equipment 200 can use the sets of PRACH resources to which the PRACH mask indexes have been assigned. For example, when an even index is specified, a set of PRACH resources with an even index can be used. When an odd index is specified, a set of PRACH resources with an odd index can be used.

It is noted that when a PRACH mask index is not indicated to the user equipment 200, the user equipment 200 may implicitly consider that a specific set of PRACH resources or a specific PRACH resource is specified, or may implicitly consider that all sets of PRACH resources are available.

In the example of FIG. 12, PRACH masking is performed such that all SSBs can be selected. In this example, one set of PRACH resources includes PRACH resources associated with all SSBs from SSB1 to SSB8. By using the PRACH mask indexes assigned as described above, a set of PRACH resources is specified.

Figure 13:
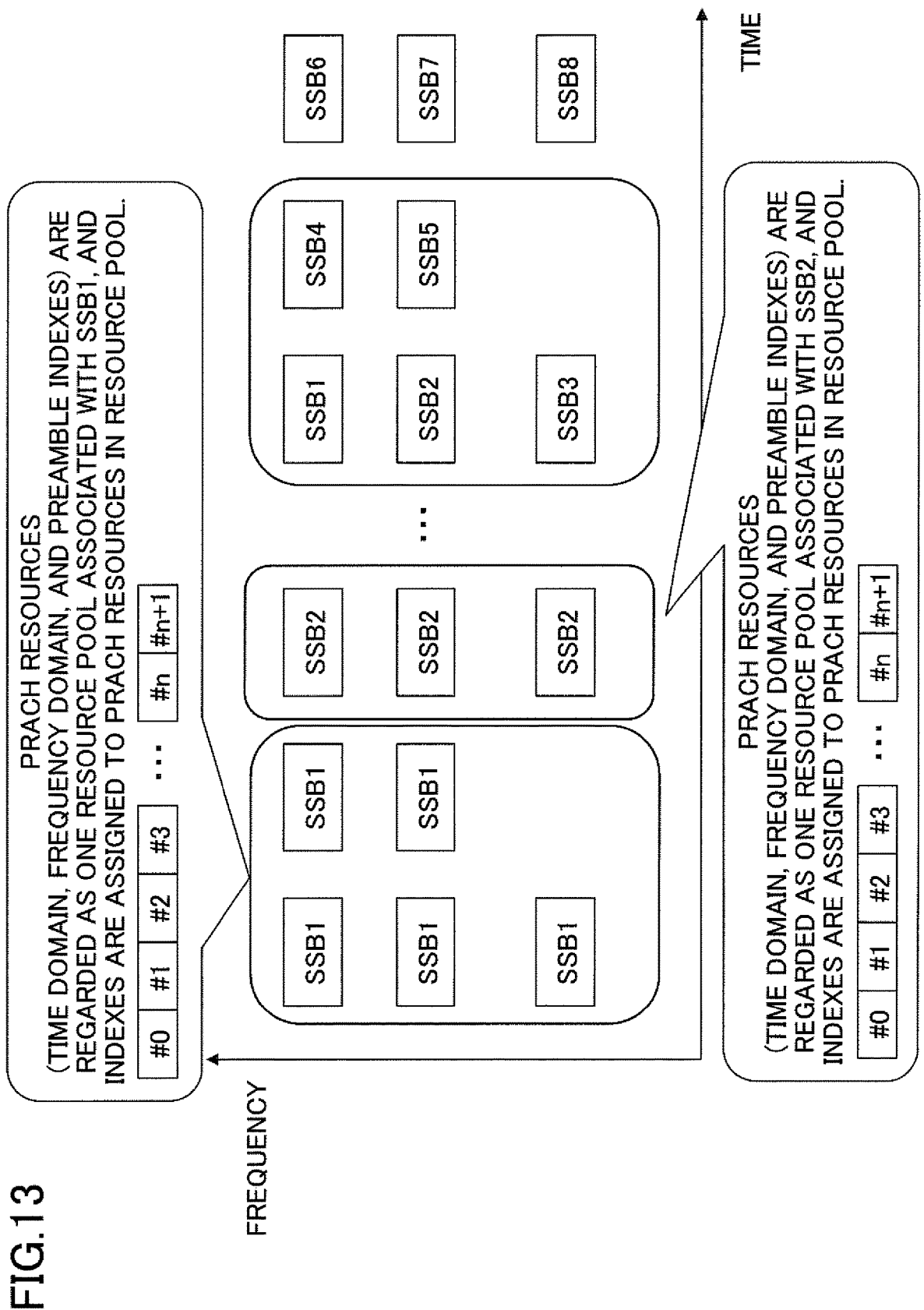
FIG. 13 is a drawing illustrating an example (3) of PRACH masking according to an embodiment of the present invention.

FIG. 13 is a drawing illustrating an example (3) of PRACH masking according to an embodiment of the present invention. By assigning indexes to PRACH transmission occasions associated with each SSB, the user equipment 200 can access all of the SSBs. As a result, the capacity of a dedicated PRACH can also improve.

The example illustrates assignment of indexes to transmission occasions used in PRACH masking. PRACH transmission occasions associated with a given SSB, namely PRACH transmission occasions associated with a given SSB and identified in the time domain, in the frequency domain, and also with preamble indexes are regarded as one resource pool. Then, indexes are assigned to the resources included in the resource pool. In this way, indexes are assigned to resources in a corresponding resource pool on a per-SSB basis. Indexes may be assigned in the order starting from the time domain to the frequency domain to preamble indexes, or in any other order. Further, for example, indexes are not necessarily assigned to preamble indexes, indexes may be assigned to the time domain and the frequency domain only, or indexes may be assigned to either the time domain or the frequency domain. Based on a PRACH mask index specifying the above-described indexes, the user equipment 200 identifies a PRACH transmission occasion in a corresponding resource pool, and uses the identified PRACH transmission occasion to transmit a preamble.

Indexes may be assigned to all RACH transmission occasions in a resource pool. Alternatively, some PRACH transmission occasions may be excluded from index assignment and may be used in other applications such as contention-based random access. The network may explicitly indicate, to the user equipment 200, which PRACH transmission occasions are excluded from index assignment, or the user equipment 200 may implicitly determine which PRACH transmission occasions are excluded from index assignment. The network may indicate exclusion from index assignment by setting an "invalid" value or an "out-of-range" value in a predetermined information element.

Further, in a case where a value of a preamble index associated with a SSB is less than or equal to 64, an index assigned a resource pool may be defined as a remainder after division of the index assigned to the resource pool by a value obtained by dividing the value of the preamble index by 2. Further, for example, in a case where a value of a preamble index associated with a SSB exceeds 64, an index assigned to a resource pool may be defined as a remainder obtained by dividing the index assigned to the resource pool by 64. The above-described value "64" may be changed for each cell, each beam, each SSB, each user equipment device 200, each frequency, each SUL, or each non-SUL, or may be changed in accordance with the network capability or setting information.

It is noted that when a PRACH mask index is not indicated to the user equipment 200, the user equipment 200 may implicitly consider that indexes in a specific resource pool are specified, or may implicitly consider that all resource pools are available.

As illustrated in FIG. 13, for example, indexes from #0 to #n+1 are assigned to PRACH transmission occasions associated with SSB1. Further, the indexes from #0 to #n+1 are assigned to PRACH transmission occasions associated with SSB2. Similarly, although not illustrated, the indexes from #0 to #n+1 are assigned to PRACH transmission occasions associated with SSB3 through SSB 8. For example, when index #0 is specified by a PRACH mask index, PRACH transmission occasions available to the user equipment 200 are a PRACH transmission occasion to which the index #0 is assigned in a resource pool associated with the SSB1, a PRACH transmission occasion to which the index #0 is assigned in a resource pool associated with the SSB2, a PRACH transmission occasion to which the index #0 is assigned in a resource pool associated with the SSB3, a PRACH transmission occasion to which the index #0 is assigned in a resource pool associated with the SSB4, a PRACH transmission occasion to which the index #0 is assigned in a resource pool associated with the SSB5, a PRACH transmission occasion to which the index #0 is assigned in a resource pool associated with the SSB6, a PRACH transmission occasion to which the index #0 is assigned in a resource pool associated with the SSB7, and a PRACH transmission occasion to which the index #0 is assigned in a resource pool associated with the SSB8. By using the above-described indexes specified by the PRACH mask index, all SSBs become available to the user equipment 200.

In the above-described embodiments, the user equipment 200 can perform a contention-free random access procedure by using a PRACH transmission occasion specified by a PRACH mask index, without limiting available SSBs as much as possible.

Accordingly, it is possible to properly indicate a RACH resource used in a random access procedure in NR to user equipment.

(Configurations of Base Station Apparatus and User Equipment)

Next, configuration examples of the base station apparatus 100 and the user equipment 200 that perform the above-described processes and operations will be described. The base station apparatus 100 and the user equipment 200 include functions for implementing the above-described embodiments. However, the base station apparatus 100 and the user equipment 200 may each include a part of the functions for implementing the above-described embodiments.

<Base Station Apparatus 100>

Figure 14:
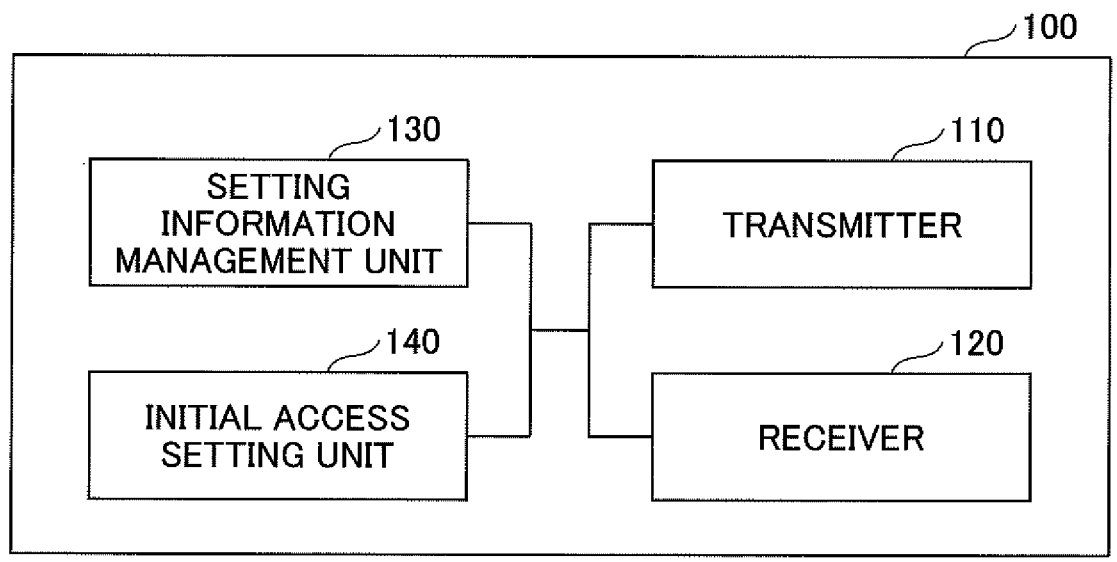
FIG. 14 is a drawing illustrating an example of a functional configuration of a base station apparatus 100 according to an embodiment of the present invention.

FIG. 14 is a drawing illustrating an example of a functional configuration of the base station apparatus 100. As illustrated in FIG. 14, the base station apparatus 100 includes a transmitter 110, a receiver 120, a setting information management unit 130, and an initial access setting unit 140. The functional configuration illustrated in FIG. 14 is merely an example. As long as the operations according to the embodiments can be performed, any functional classifications and names of functional units may be used.

The transmitter 110 includes a function to generate a signal to be transmitted to the user equipment 200, and to wirelessly transmit the signal. The signal receiver 220 includes a function to wirelessly receive various types of signals transmitted from the user equipment 200, and to obtain higher layer information from the received signals. Further, the transmitter 110 includes a function to transmit signals such as a NR-PSS, a NR-SSS, a NR-PBCH, and a DL/UL control signal to the user equipment 200. Also, for example, the transmitter 110 includes a function to transmit, to the user equipment 200, broadcast information or UL scheduling that includes information used for initial access, and the receiver 120 includes a function to receive a RACH preamble from the user equipment 200.

The setting information management unit 130 stores preliminarily configured setting information and also various types of setting information to be transmitted to the user equipment 200. Examples of such setting information include information related to transmission and reception parameters used for initial access.

The initial access setting unit 140 indicates, to the user equipment 200, information used for initial access, performs a process when a random access preamble is transmitted from the user equipment 20, and transmits random access response, for example.

<User Equipment 200>

Figure 15:
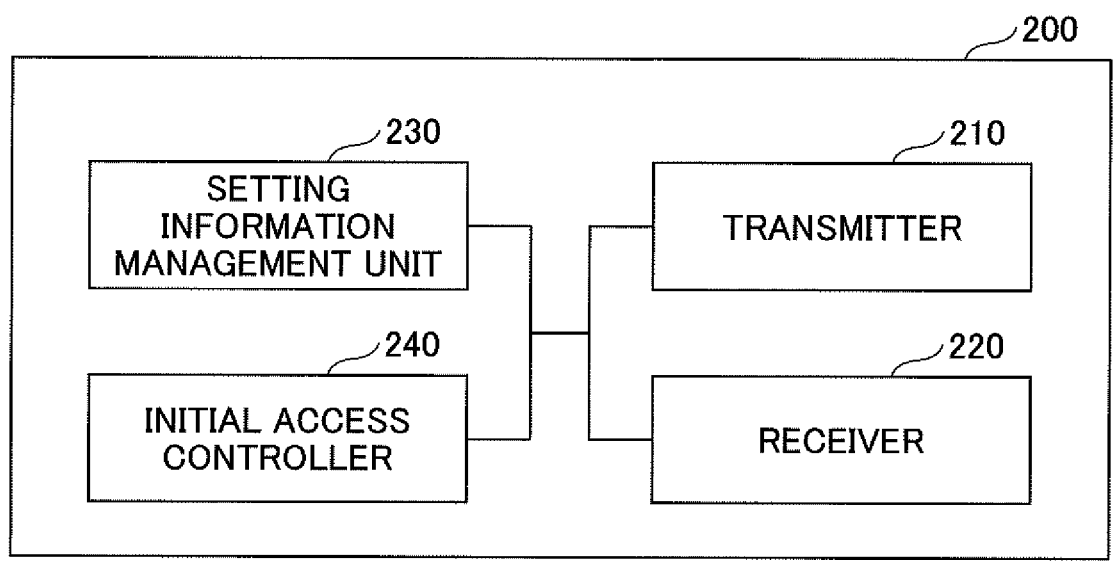
FIG. 15 is a drawing illustrating an example of a functional configuration of user equipment 200 according to an embodiment of the present invention.

FIG. 15 is a drawing illustrating an example of a functional configuration of the user equipment 200. As illustrated in FIG. 15, the user equipment 200 includes a transmitter 210, a receiver 220, a setting information management unit 230, and an initial access controller 240. The functional configuration illustrated in FIG. 15 is merely an example. As long as the operations according to the embodiments can be performed, any functional classifications and names of functional units may be used.

The transmitter 210 generates a transmission signal from transmission data, and wirelessly transmits the transmission signal. The signal receiver 102 wirelessly receives various types of signals, and obtains higher layer signals from the received physical layer signals. Further, the receiver 220 includes a function to receive, for example, a NR-PSS, a NR-SSS, a NR-PBCH, and a DL/UL control signal from the base station apparatus 100. Also, for example, the transmitter 210 includes a function to transmit, for example, a NR-PRACH and a NR-PUSCH to the base station apparatus 100.

The setting information management unit 230 stores various types of setting information received from the base station apparatus 100 by the receiver 220. The setting information management unit 230 also stores preliminarily configured setting information. Examples of such setting information include information related to transmission and reception parameters used for initial access.

As described in the embodiments, the initial access controller 240 generates a preamble and a message to be transmitted from the user equipment 200 to the base station apparatus 100 during initial access. Further, the initial access controller 240 controls transmission power of the preamble during initial access. A functional unit related to signal transmission in the initial access controller 240 may be included in the transmitter 210, and a functional unit related to signal reception in the initial access controller 240 may be included in the receiver 220.

(Hardware Configuration)

The functional configuration diagrams (FIG. 14 and FIG. 15) used in the above description of the embodiments illustrate functional unit blocks. These functional blocks (components) are implemented in any combination of hardware and/or software. Also, means for implementing the functional blocks are not particularly limited. In other words, the functional blocks may be implemented in one physically and/or logically coupled device or in multiple devices where two or more physically and/or logically separated devices are connected directly and/or indirectly (for example, in wired and/or wireless manners).

Figure 16:
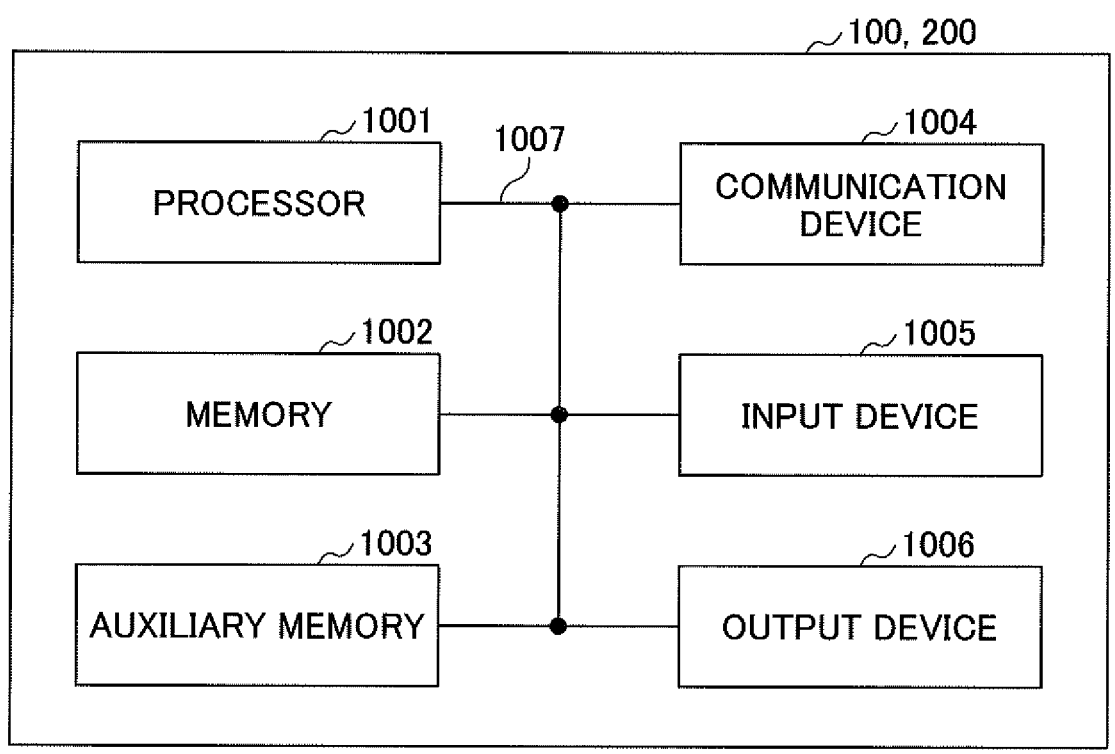
FIG. 16 is a drawing illustrating an example of a hardware configuration of the base station apparatus 100 or the user equipment 200 according to an embodiment of the present invention.

For example, the base station apparatus 100 and the user equipment 200 according to one embodiment of the present invention may each function as a computer that performs processes according to the embodiments of the present invention. FIG. 16 is a drawing illustrating a hardware configuration of a radio communication apparatus, which is the base station apparatus 100 or the user equipment 200, which is a radio communication apparatus, according to the embodiments. The above-described base station apparatus 100 and the user equipment 200 may each be physically configured as a computer including a processor 1001, a memory 1002, an auxiliary memory 1003, a communication device 1004, an input device 1005, an output device 1006, and a bus 1007.

In the following description, the term "apparatus" can be interchangeably read as a circuit, a device, a unit or the like. The hardware configuration of each of the base station apparatus 100 and the user equipment 200 may be configured to include the illustrated one or more devices indicated by 1001 through 1006 or may be configured not to include a part of the devices.

Functions of the base station apparatus 100 and the user equipment 200 are implemented by causing hardware such as the processor 1001 and the memory 1002 to read predetermined software (a program) so as to allow the processor 1001 to execute operations, communicate with the communication device 1004, and control reading and/or writing data from/into the memory 1002 and the auxiliary memory 1003.

The processor 1001 controls the whole computer by, for example, running an operating system. The processor 1001 may be configured by a central processing unit (CPU) including an interface with a peripheral device, a control device, an arithmetic device, and a register.

Also, the processor 1001 reads programs (program codes), software modules, and data from the auxiliary memory 1003 and/or the communication device 1004 into the memory 1002, and executes various processes in accordance therewith. Examples of the programs include a program for causing the computer to execute at least a part of operations described in the above embodiments. For example, the transmitter 110, the receiver 120, the setting information management unit 130, and the initial access setting unit 140 of the base station apparatus 100 illustrated in FIG. 14 may be stored in the memory 1002, and may be implemented by control programs executed by the processor 1001. Also, for example, the transmitter 210, the receiver 220, the setting information management unit 230, and the initial access controller 240 of the user equipment 200 illustrated in FIG. 15 may be stored in the memory 1002, and may be implemented by control programs executed by the processor 1001. Although an example in which the above-described various types of processes are performed by the single processor 1001 has been described, the processes may be simultaneously or sequentially performed by two or more processors 1001. The processor 1001 may be implemented with one or more chips. Note that the programs may be transmitted from a network via an electric communication line.

The memory 1002 is a computer-readable recording medium, and may include at least one of read-only memory (ROM), erasable programmable ROM (EPROM), electrically erasable programmable ROM (EEPROM), and random-access memory (RAM), for example. The memory 1002 may be referred to as a register, a cache, or a main memory (a main storage device). The memory 1002 can store, for example, programs (program codes) and software modules that can be executed so as to perform the processes according to one embodiment of the present invention.

The auxiliary memory 1003 is a computer-readable recording medium, and may include at least one of an optical disc such as a compact disc read-only memory (CD-ROM), a hard disk drive, a flexible disk, a magnetic optical disc (such as a compact disc, a digital versatile disc, and a Blu-ray (registered trademark) disk), a smart card, flash memory (such as a card, a stick, and a key drive), a floppy (registered trademark) disk, and a magnetic strip. The auxiliary memory 1003 may be referred to as an auxiliary storage device. The above-described recording mediums may be a database or a server including the memory 1002 and/or the auxiliary memory 1003, or may be any other appropriate mediums.

The communication device 1004 is hardware (a transmitting/receiving device) that performs communication between computers via a wired and/or wireless network, and may be referred to as a network device, a network controller, a network card, or a communication module. For example, the transmitter 110 and the receiver 120 of the base station apparatus 100 may be implemented by the communication device 1004. Also, the transmitter 210 and the receiver 220 of the user equipment 200 may be implemented by the communication device 1004.

The input device 1005 is an input device (such as a keyboard, a mouse, a microphone, a switch, a button, or a sensor) that receives inputs from the outside. The output device 1006 is an output device (such as a display, a speaker, or a LED ramp) that provides outputs to the outside. Note that the input device 1005 and the output device 1006 may be an integrated device (for example, a touch panel).

Also, the devices such as the processor 1001 and the memory 1002 are connected with each other via the bus 1007 that communicates information. The bus 1007 may be a single bus or may be different buses for different devices.

Also, each of the base station apparatus 100 and the user equipment 200 may be configured to include hardware such as a macro processor, a digital signal processor (DSP), an application-specific integrated circuit (ASIC), a programmable logic device (PLD), and a field-programmable gate array (FPGA), and a part or all of the functional blocks may be implemented by the hardware. For example, the processor 1001 may include at least one of these hardware devices.

Summary of Embodiments

As described above, according to an embodiment of the present invention, user equipment for receiving an instruction to perform a random access procedure from a base station apparatus is provided. The user equipment includes a receiver configured to receive, from the base station apparatus, information specifying available random access channel transmission occasions from random access channel transmission occasion candidates, a controller configured to identify a random access channel transmission occasion based on the information, and a transmitter configured to transmit a random access preamble by using the identified random access channel transmission occasion.

With the above configuration, it is possible for the user equipment 200 to perform a contention-free random access procedure by using a PRACH transmission occasion identified by a PRACH mask. Accordingly, it is possible to properly indicate, to the user equipment, a RACH resource used in a random access procedure in NR.

The information specifying the available random access channel transmission occasions may correspond to an index that specifies a plurality of random access channel transmission occasions within a cycle in a time domain of random access channel transmission occasions associated with a synchronization block. With this configuration, it is possible for the user equipment 200 to perform a contention-free random access procedure by using a PRACH transmission occasion specified by a PRACH mask index, without limiting available SSBs as much as possible.

The plurality of random access channel transmission occasions may include random access channel transmission occasions associated with all synchronization blocks. With this configuration, it is possible for the user equipment 200 to perform a contention-free random access procedure by using a PRACH transmission occasion, which is identified by a PRACH mask associated with all SSBs.

The information specifying the available random access channel transmission occasions may correspond to common indexes that are assigned to random access channel transmission occasions associated with each of all synchronization blocks. With this configuration, it is possible for the user equipment 200 to perform a contention-free random access procedure by using a PRACH transmission occasion, which is identified by a PRACH mask associated with all SSBs.

An index may be defined as a remainder obtained by dividing the common indexes by a predetermined value. With this configuration, it is possible for the user equipment 200 to perform a contention-free random access procedure by using a PRACH transmission occasion, which is identified by a PRACH mask index based on a small amount of information.

Further, according to an embodiment of the present invention, a base station apparatus for instructing user equipment to perform a random access procedure is provided. The base station apparatus includes a transmitter configured to transmit, to the user equipment, information specifying at least one available random access channel transmission occasion from random access channel transmission occasion candidates, a processor configured to identify a given random access channel transmission occasion based on the information, and a receiver configured to receive a random access preamble by using the identified given random access channel transmission occasion.

With the above configuration, it is possible for the base station apparatus 100 to cause the user equipment 200 to perform a contention-free random access procedure by using a PRACH transmission occasion identified by a PRACH mask. Accordingly, it is possible for the base station apparatus 100 to properly indicate, to user equipment, a RACH resource used in a random access procedure in NR.

Further, according to an embodiment of the present invention, user equipment for receiving an instruction to perform a random access procedure from a base station apparatus is provided. The user equipment includes a receiver configured to receive, from the base station apparatus, information specifying at least one available random access channel transmission occasion associated with a synchronization block, a controller configured to identify a given random access channel transmission occasion based on the information, and a transmitter configured to transmit a random access preamble by using the identified given random access channel transmission occasion.

With the above configuration, it is possible for the user equipment 200 to perform a contention-free random access procedure by using a PRACH transmission occasion identified by a PRACH mask. Accordingly, it is possible to properly indicate, to the user equipment, a RACH resource used in a random access procedure in NR.

Further, according to an embodiment of the present invention, the available random access channel transmission occasions may include a plurality of random access channel transmission occasions for each cycle in a time domain of random access channel transmission occasions associated with a synchronization block. With this configuration, it is possible for the user equipment 200 to perform a contention-free random access procedure by using a PRACH transmission occasion identified by a PRACH mask, without limiting available SSBs as much as possible.

Further, according to an embodiment of the present invention, the available random access channel transmission occasions may include a plurality of random access channel transmission occasions associated with each of all synchronization blocks, and common indexes may be assigned to the plurality of random access channel transmission occasions. With this configuration, it is possible for the user equipment 200 to perform a contention-free random access procedure by using a PRACH transmission occasion, which is identified by a PRACH mask associated with all SSBs.

Further, according to an embodiment of the present invention, a base station apparatus for instructing user equipment to perform a random access procedure is provided. The base station apparatus includes a transmitter configured to transmit, to the user equipment, information specifying available random access channel transmission occasions associated with a synchronization block, a processor configured to identify a random access channel transmission occasion based on the information, and a receiver configured to receive a random access preamble by using the identified random access channel transmission occasion.

With the above configuration, it is possible for the base station apparatus 100 to cause the user equipment 200 to perform a contention-free random access procedure by using a PRACH transmission occasion identified by a PRACH mask. Accordingly, it is possible to properly indicate, to user equipment, a RACH resource used in a random access procedure in NR.

Supplements to Embodiments

Although the embodiments of the present invention have been described above, the disclosed invention is not limited to the embodiments, and persons skilled in the art will appreciate various variations, modifications, alternatives, replacements, and the like. Specific examples of numerical values are used in the description in order to facilitate understanding of the present invention. However, these numerical values are merely examples, and any other appropriate values may be used, unless otherwise specified. Classifications of items in the above description are not essential to the present invention. Depending on necessity, subject matter described in two or more items may be combined and used, and subject matter described in an item may be applied to subject matter described in another item (as long as no contradiction occurs). A boundary of a functional unit or a processing unit in the functional block diagrams does not necessarily correspond to a boundary of a physical component. An operation by a plurality of functional units may be physically executed by a single component, or an operation of a single functional unit may be physically executed by a plurality of components. The orders of the procedures described in the embodiments may be changed as long as no contradiction occurs. For the convenience of description, the base station apparatus 100 and the user equipment 200 have been described by using the functional block diagrams; however, such devices may be implemented in hardware, software, or combinations thereof. Software executed by the processor included in the user equipment 200 in accordance with the embodiments of the present invention and software executed by the processor included in the base station apparatus 100 in accordance with the embodiments of the present invention may be stored in any appropriate storage medium, such as random-access memory (RAM), flash memory, read-only memory (ROM), EPROM, EEPROM, a register, a hard disk drive (HDD), a removable disk, a CD-ROM, a database, and a server.

Notification of information is not limited to the aspects/embodiments described herein and may be performed in any other manner. For example, information may be indicated by physical layer signaling (for example, downlink control information (DCI) and uplink control information (UCI)), higher layer signaling (for example, radio resource control (RRC) signaling, medium access control (MAC) signaling, broadcast information (master information block (MIB), and system information block (SIB))), any other signal, or a combination thereof. Also, the RRC signaling may be referred to as an RRC message, and may be an RRC connection setup message or an RRC connection reconfiguration message.

The aspects/embodiments disclosed herein may be applied to systems that utilize Long-Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, UWB (ultra-wideband), Bluetooth (registered trademark), or any other appropriate system, and/or next-generation systems enhanced based on the above systems.

The orders of procedures, sequences, and flowcharts of the aspects/embodiments described herein may be changed, as long as no contradiction occurs. For example, in methods described herein, various steps are presented in an exemplary order, and are not limited to a specific order presented.

Certain operations described as being performed by the base station apparatus 100 may be performed by its upper node, in some cases. In a network including one or more network nodes having the base station apparatus 100, it is apparent that various operations performed for communication with the user equipment 200 may be performed by the base station apparatus 100 and/or a network node other than the base station apparatus 100 (for example, a mobility management entity (MME) or a serving-gateway (S-GW) may be assumed, but the network node is not limited thereto). Although an example in which a single network node other than the base station apparatus 100 is used has been described, multiple other network nodes (for example, MMEs and S-GWs) may be used in combination.

The aspects/embodiments described herein may be used alone or may be used in combination, or may be switched at the time of execution.

The user equipment 200 may be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate term.

The base station apparatus 100 may be referred to by those skilled in the art as NodeB (NB), evolved NodeB (eNB), next-generation NodeB (gNB), a base station, or some other appropriate term.

As used herein, the terms "determining" and "deciding" may include various operations. For example, the terms "determining" and "deciding" may include determining and deciding that judging, calculating, computing, processing, deriving, investigating, looking up (for example, looking up a table, a database, or any other data structure), or ascertaining is considered to be performed. Also, the terms "determining" and "deciding" may include determining and deciding that receiving (for example, receiving information), transmitting (for example, transmitting information), inputting, outputting, or accessing (for example, accessing data in a memory) is considered to be performed. Also, the terms "determining" and "deciding" may include determining and deciding that resolving, selecting, choosing, establishing, or comparing is considered to be performed. Namely, "determining" and "deciding" may include determining and deciding that any operation is considered to be performed.

As used herein, the term "based on" does not mean "based only on", unless otherwise specified. In other words, the term "based on" means both "based only on" and "based at least on".

As long as the terms "include", "including", and any variation thereof are used in this specification or in the claims, these terms are intended to be inclusive similar to the term "comprising". Further, the term "or" used in this specification or in the claims is intended not to be "exclusive or".

Throughout the disclosures herein, for example, if articles such as "a", "an", and "the" in English are added to the translation, these articles may include plurality, unless the context clearly indicates otherwise.

In the embodiments of the present invention, the initial access controller 240 is an example of a controller. The initial access setting unit 140 is an example of a setting unit. A SSB is an example of a synchronization block. The PRACH transmission occasion is an example of a random access channel transmission occasion.

Although the embodiments of the present invention have been described in detail, it will be readily apparent to those skilled in the art that the present invention is not limited to the embodiments described in this specification. Variations and modifications can be made to the present invention without departing from the scope of the present invention described in the claims. Accordingly, the description herein is intended to provide an illustrative description and is not intended to have any restrictive meaning to the present invention.

The present application is based on and claims priority to Japanese patent application No. 2018-038095 filed on Mar. 2, 2018, with the Japanese Patent Office, the entire contents of which are hereby incorporated by reference.

DESCRIPTION OF THE REFERENCE NUMERALS 100 base station apparatus
110 transmitter
120 receiver
130 setting information management unit
140 initial access setting unit
200 user equipment
210 transmitter
220 receiver
230 setting information management unit
240 initial access controller
1001 processor
1002 memory
1003 auxiliary memory
1004 communication device
1005 input device
1006 output device

What is claimed is:

1. A terminal for receiving an instruction to perform a random access procedure from a base station apparatus, the terminal comprising:
 a receiver configured to receive, from the base station apparatus, information specifying at least one available random access channel transmission occasion associated with a synchronization block;
 a controller configured to identify a random access channel transmission occasion based on the information; and
 a transmitter configured to transmit a random access preamble by using the identified random access channel transmission occasion,
 wherein a period of the available random access channel transmission occasion associated with the synchronization block is calculated based on a period of a random access channel transmission occasion, a number of synchronization blocks associated with the random access channel transmission occasion, and a number of synchronization blocks,
 wherein the information includes a 4-bit field indicating a physical random access channel mask index specifying at least one available random access channel transmission occasion associated with the synchronization block, and
 wherein random access channel masking is performed per random access channel transmission occasions associated with a synchronization block.

2. The terminal according to claim 1, wherein the at least one available random access channel transmission occasion includes a plurality of random access channel transmission occasions, and a common index is assigned to the plurality of random access channel transmission occasions associated with respective synchronization blocks, the respective synchronization blocks including all synchronization blocks.

3. A base station apparatus for instructing a terminal to perform a random access procedure, the base station apparatus comprising:
 a transmitter configured to transmit, to the terminal, information specifying at least one available random access channel transmission occasion associated with a synchronization block;
 a processor configured to identify a random access channel transmission occasion based on the information; and
 a receiver configured to receive a random access preamble by using the identified random access channel transmission occasion,
 wherein a period of the available random access channel transmission occasion associated with the synchronization block is calculated based on a period of a random access channel transmission occasion, a number of synchronization blocks associated with the random access channel transmission occasion, and a number of synchronization blocks, and
 wherein the information includes a 4-bit field indicating a physical random access channel mask index specifying at least one available random access channel transmission occasion associated with the synchronization block, and
 wherein random access channel masking is performed per random access channel transmission occasions associated with a synchronization block.

4. A wireless communication method of a terminal for receiving an instruction to perform a random access procedure from a base station apparatus, the wireless communication method comprising:
 receiving, from the base station apparatus, information specifying at least one available random access channel transmission occasion associated with a synchronization block;
 identifying a random access channel transmission occasion based on the information; and
 transmitting a random access preamble by using the identified random access channel transmission occasion,
 wherein a period of the available random access channel transmission occasion associated with the synchronization block is calculated based on a period of a random access channel transmission occasion, a number of synchronization blocks associated with the random access channel transmission occasion, and a number of synchronization blocks, and
 wherein the information includes a 4-bit field indicating a physical random access channel mask index specifying at least one available random access channel transmission occasion associated with the synchronization block, and
 wherein random access channel masking is performed per random access channel transmission occasions associated with a synchronization block.

* * * * *